(12) United States Patent
Tavildar et al.

(10) Patent No.: US 8,565,169 B2
(45) Date of Patent: Oct. 22, 2013

(54) TIMING SYNCHRONIZATION METHODS AND APPARATUS

(75) Inventors: Saurabh Tavildar, Jersey City, NJ (US); Ashwin Sampath, Princeton, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 12/686,062

(22) Filed: Jan. 12, 2010

(65) Prior Publication Data

US 2011/0170465 A1    Jul. 14, 2011

(51) Int. Cl.
*H04W 4/00* (2009.01)
*H04W 56/00* (2009.01)

(52) U.S. Cl.
USPC .......................... 370/329; 370/338; 370/341

(58) Field of Classification Search
None
See application file for complete search history.

(56) References Cited

U.S. PATENT DOCUMENTS

| | | | |
|---|---|---|---|
| 7,027,773 B1 | 4/2006 | McMillin | |
| 2003/0026240 A1 | 2/2003 | Eyuboglu et al. | |
| 2004/0147272 A1 | 7/2004 | Shiota et al. | |
| 2007/0037610 A1* | 2/2007 | Logan | 455/574 |
| 2007/0064742 A1* | 3/2007 | Shvodian | 370/503 |
| 2007/0171910 A1 | 7/2007 | Kumar | |
| 2007/0208841 A1 | 9/2007 | Barone et al. | |
| 2007/0238483 A1* | 10/2007 | Boireau et al. | 455/553.1 |
| 2007/0270129 A1* | 11/2007 | Luo | 455/414.1 |
| 2007/0286136 A1 | 12/2007 | Rittle et al. | |
| 2008/0049700 A1 | 2/2008 | Shah et al. | |
| 2008/0181154 A1 | 7/2008 | Sherman | |
| 2008/0247344 A1 | 10/2008 | Bahl et al. | |
| 2009/0010179 A1 | 1/2009 | Laroia et al. | |
| 2009/0135751 A1* | 5/2009 | Hodges et al. | 370/311 |
| 2009/0279466 A1* | 11/2009 | Ji et al. | 370/311 |
| 2009/0305732 A1* | 12/2009 | Marcellino et al. | 455/466 |
| 2010/0177708 A1 | 7/2010 | Pandey et al. | |
| 2010/0329230 A1* | 12/2010 | Yang et al. | 370/345 |
| 2011/0019601 A1 | 1/2011 | Li et al. | |
| 2012/0307698 A1 | 12/2012 | Tavildar et al. | |

FOREIGN PATENT DOCUMENTS

| | | | |
|---|---|---|---|
| EP | 1976165 A2 | 10/2008 | |
| EP | 2139168 A1 | 12/2009 | |
| WO | WO2006056174 A1 | 6/2006 | |
| WO | WO2006067271 A1 | 6/2006 | |

OTHER PUBLICATIONS

International Search Report and Written Opinion—PCT/US2011/020980—ISA/EPO—May 4, 2011 (092218WO).
International Search Report and Written Opinion—PCT/US2010/042797, International Search Authority—European Patent Office—Oct. 18, 2010.

* cited by examiner

*Primary Examiner* — Chi Pham
*Assistant Examiner* — Soon-Dong D Hyun
(74) *Attorney, Agent, or Firm* — Paul S. Holdaway

(57) ABSTRACT

Various methods and apparatus are directed to achieving timing synchronization and propagating timing information pertaining to an external, e.g., non Wi-Fi, timing signal source. In some embodiments, a mobile communications device receives and processes a timing signal, e.g., a first Wi-Fi beacon, which is propagating timing information about an external timing signal from a device which directly received the external timing signal. Thus, a mobile wireless communications device achieves timing synchronization with respect to an external timing signal which it is unable to receive directly. In various embodiments, the mobile communications device may, and sometimes does, further propagate the timing information about the external timing signal, e.g., via a second Wi-Fi beacon signal which it generates and transmits. Synchronization with respect to an external signal source facilitates longer sleep states and decreased power consumption.

19 Claims, 16 Drawing Sheets

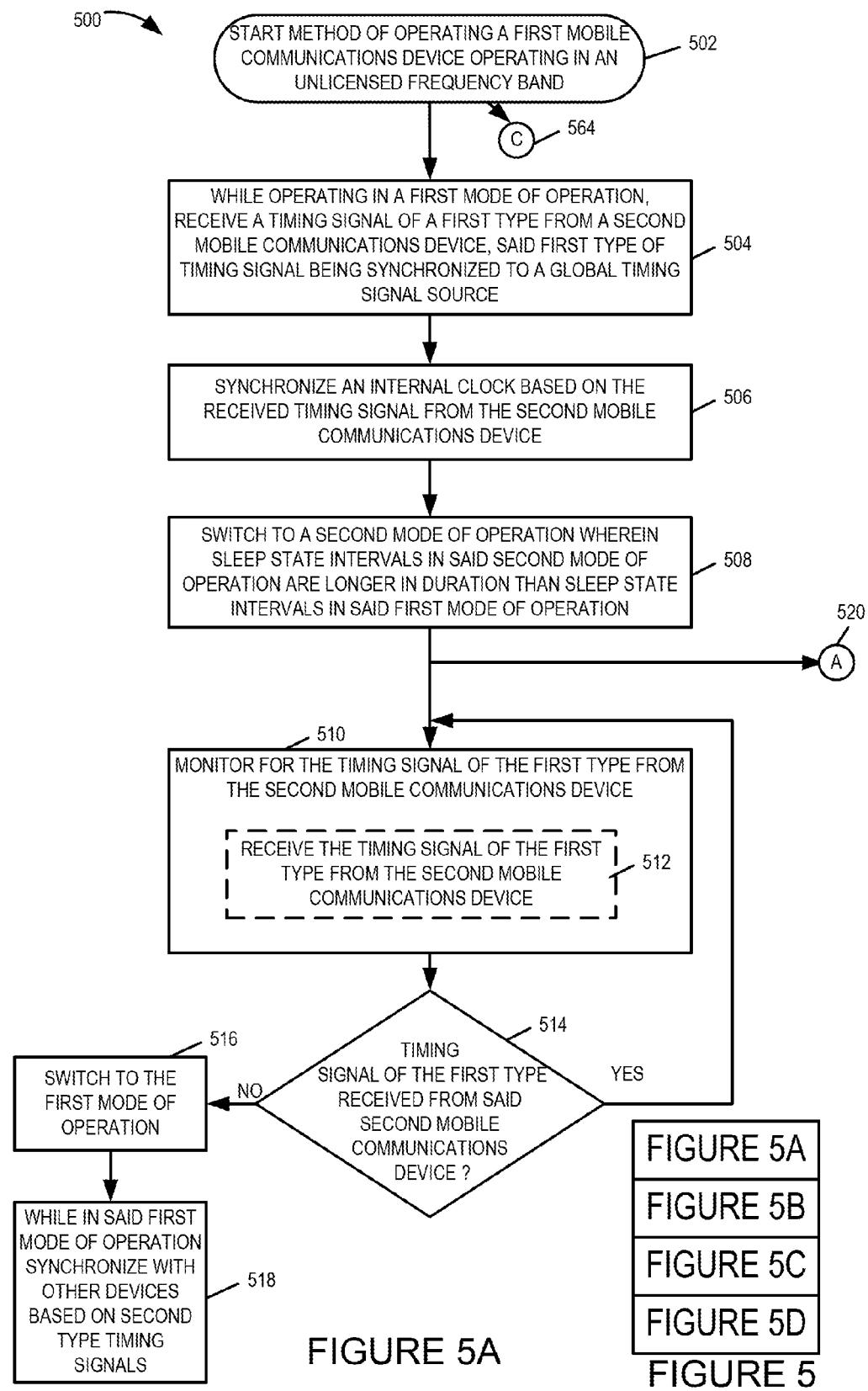

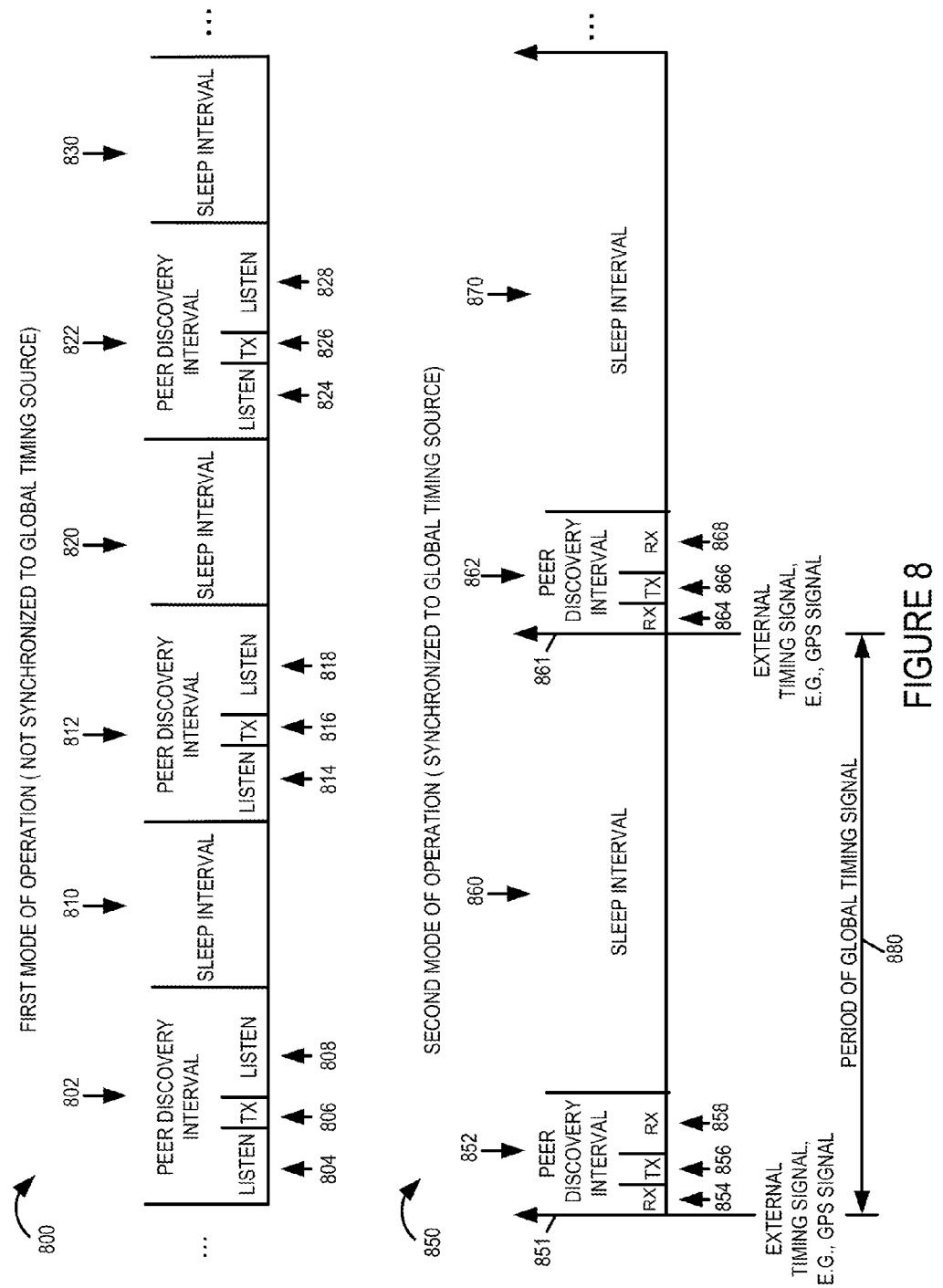

TIMING SYNCHRONIZATION METHODS AND APPARATUS

FIELD

Various embodiments relate to wireless communications, and more particularly, to methods and apparatus for synchronizing mobile communications devices.

BACKGROUND

WiFi chips typically draw a lot of current while in use, making it infeasible to run certain kinds of WiFi applications using existing methods on cellular devices. Even though certain power saving features have been proposed, generally they remain inefficient in terms of power consumption to run WiFi applications on a cellular device, even when the device is in passive mode, without significantly impacting the standby time. Examples of such power intensive applications include peer discovery, routing information exchange, and traffic monitoring. Part of the power consumption problem relates to the relatively low level of synchronization in Wi-Fi systems and the relatively high amount of time needed to monitor for activity from other devices. If higher levels of synchronization could be achieved, monitoring time could be reduced, sleep time could be increased, and power consumption could be reduced. Based on the above discussion there is a need for methods and apparatus for increasing timing synchronization and thus potentially reduce device power consumption, e.g., by increasing the amount of sleep time compared to less synchronized devices.

SUMMARY

Exemplary methods and apparatus related to timing synchronization in a wireless communications system are described. Various methods and apparatus are well suited for supporting efficient peer to peer networks operating in unlicensed frequency spectrum. Various methods and apparatus are directed to the propagation of timing information pertaining to an external timing source. Some embodiments are well suited to wireless communications systems in which devices with different capabilities are deployed. For example, some devices, e.g., high end devices, in the system may include an external timing signal receiver, e.g., a GPS receiver, for receiving a timing signal from a non Wi-Fi device. Other devices, e.g., low end devices, may not include the external signal receiver for receiving a timing signal from a non Wi-Fi device. Exemplary methods and apparatus facilitate synchronization with respect to the external signal source by devices lacking a receiver supporting the type of signals transmitted by the external signal source.

In some embodiments, a mobile wireless communications device achieves timing synchronization with respect to an external timing signal, e.g., a global timing signal, which it is unable to receive directly, e.g., the external timing signal is a GPS signal and the mobile wireless communications device does not include a GPS receiver. In some embodiments, the mobile communications device receives and processes a timing signal, e.g., a first Wi-Fi beacon, which is propagating timing information about the external timing signal, e.g. GPS signal. In various embodiments, the mobile communications device may, and sometimes does, further propagate the timing information about the external timing signal, e.g., via a second Wi-Fi beacon signal which it generates and transmits. Thus an extended network, synchronized to the external timing signal is formed, including both devices which are able to directly receive the external timing signal and those which are not able to directly receive the external timing signal.

An exemplary method of operating a first mobile communications device operating in an unlicensed frequency band, in accordance with some embodiments, comprises: while operating in a first mode of operation, receiving a timing signal of a first type from a second mobile communications device, said first type of timing signal being synchronized to a global timing signal source, and synchronizing an internal clock based on the received timing signal from the second mobile communications device. The exemplary method, in some embodiments, further comprises after synchronizing the internal clock, switching to a second mode of operation wherein sleep state intervals in said second mode of operation are longer in duration than sleep state intervals in said first mode of operation.

A first mobile communications device, in accordance with some embodiments, comprises: at least one processor configured to: receive a timing signal of a first type from a second mobile communications device while operating in a first mode of operation, said first type of timing signal being synchronized to a global timing signal source, synchronize an internal clock based on the received timing signal from the second mobile communications device, and switch to a second mode of operation wherein sleep state intervals in said second mode of operation are longer in duration than sleep state intervals in said first mode of operation, after synchronizing the internal clock. The first mobile communications device further comprise memory coupled to said at least one processor.

In some, but not necessarily all embodiments, propagation of timing synchronization signals is performed based on available battery power, the source of the signal upon which the timing signal to be propagated is based and the number of timing signals, e.g., beacon signals, detected in a given time period.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 5A is a first part of a flowchart of an exemplary method of operating a first mobile communications device operating in an unlicensed frequency band in accordance with an exemplary embodiment.

FIG. 8 shows an exemplary timing structure used by an exemplary mobile communications device in a first mode of operation in which the mobile communications is not synchronized with respect to a global timing source and a different exemplary timing structure used by the exemplary mobile communications device in a second mode of operation in which the mobile communications is synchronized with respect to a global timing source.

DETAILED DESCRIPTION

Figure 1:
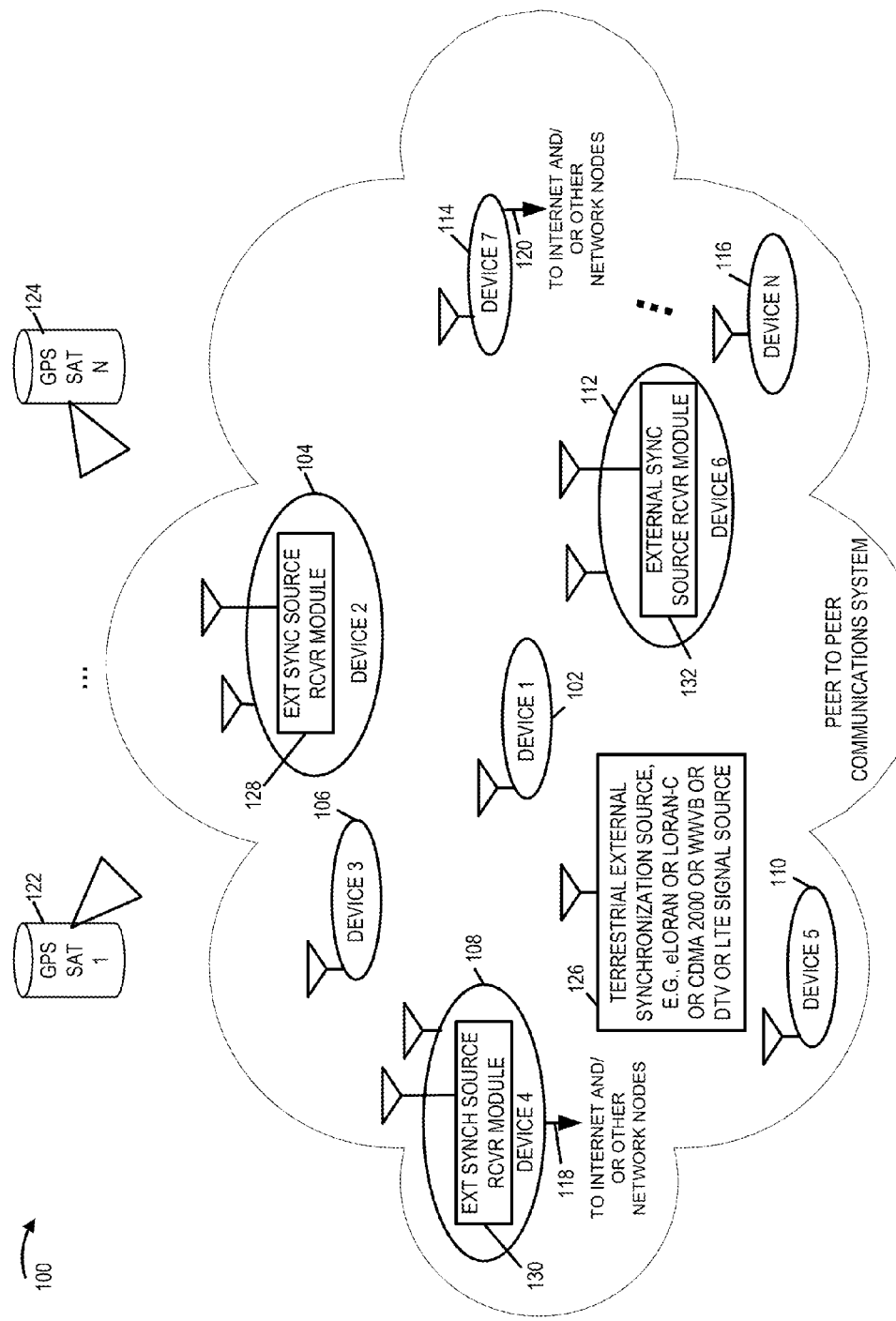
FIG. 1 is a drawing of an exemplary wireless peer to peer communications system in accordance with an exemplary embodiment.

FIG. 1 is a drawing of an exemplary wireless peer to peer communications system 100 in accordance with an exemplary embodiment. Exemplary wireless peer to peer communications system 100 includes a plurality of wireless communications devices (device 1 102, device 2 104, device 3 106, device 4 108, device 5 110, device 6 112, device 7 114, . . . , device N 116. Some of the wireless communications devices in system 100, e.g., device 4 108 and device 7 114 include an interface (118, 120), respectively, to the Internet and/or other network nodes. Some of the wireless communications devices in system 100, e.g., device 1 102, device 2 104, device 3 106, device 4 108, device 5 110, device 6 112, device 7 114, and device N 116, are mobile wireless communications devices, e.g., handheld mobile devices. Some of the communications device in system 100, e.g., device 2 104, device 4 108, and device 6 112, include an external synchronization source receiver module (128, 130, 132), respectively. Other communications devices in the system 100, e.g., device 1 102, device 3 106, device 5 110, device 7 114 and device N 116, do not include a module for achieving synchronization directly from the external synchronization source.

In some embodiments, the external synchronization source signal is a GPS signal, e.g., from one or more GPS satellites (GPS satellite 1 122, . . . , GPS satellite N 124). In some embodiments, the external synchronization source signal is a terrestrial external synchronization source signal, e.g., a eLORAN signal or a LORAN-C signal, or CDMA 2000 signal or WWVB signal or DTV signal or LTE signal. Exemplary node 126 is an exemplary terrestrial synchronization source. In some embodiments, the external synchronization source may be located on water, e.g., situated on a platform or located in a water vehicle. In some embodiments, the external synchronization source may be located in the air, e.g., situated in an air vehicle.

Figure 2:
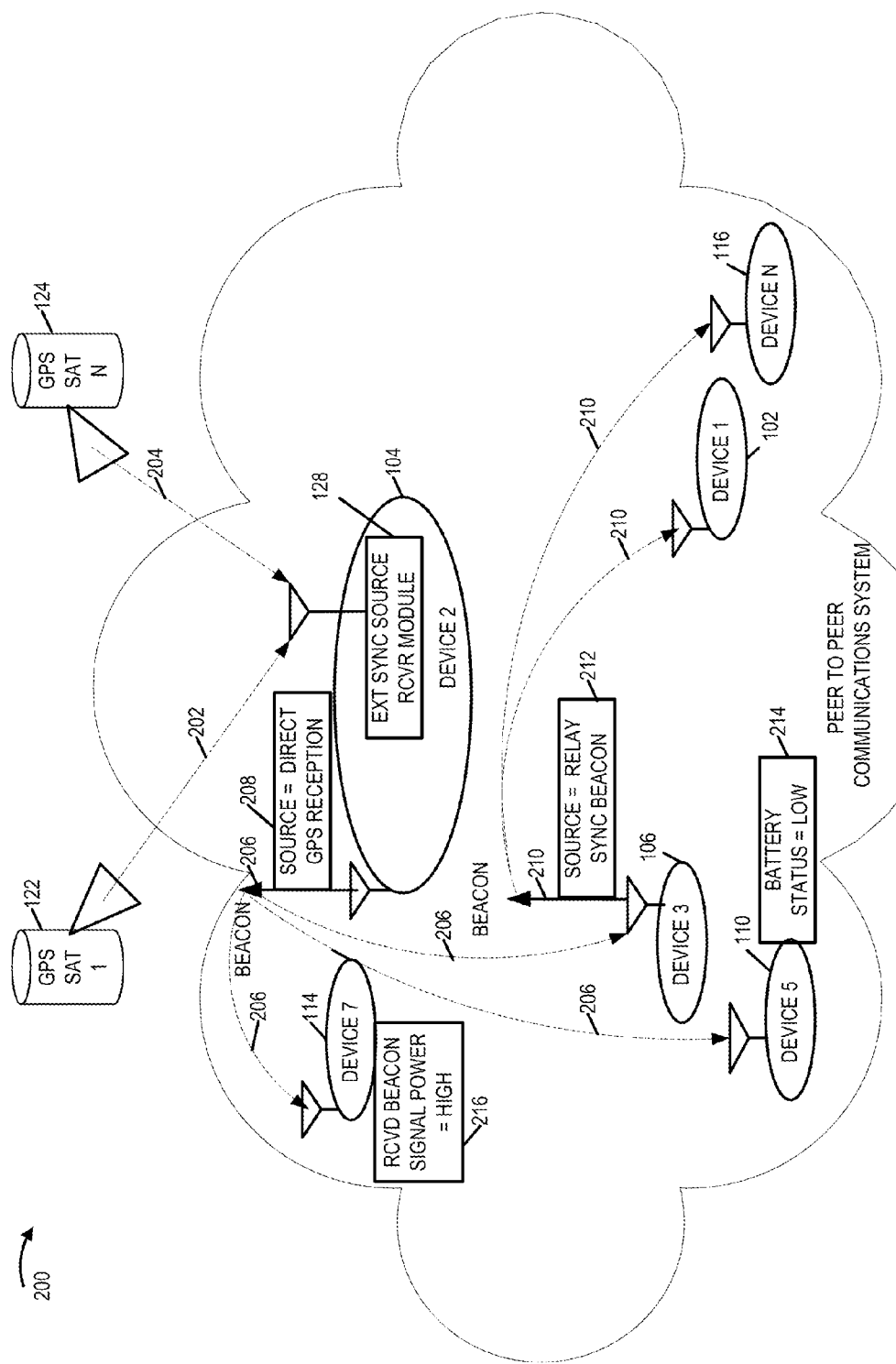
FIG. 2 is a drawing illustrating an example in which an external synchronization source is used in exemplary peer to peer system of FIG. 1 to provide a high level of synchronization among peer to peer devices.

FIG. 2 is a drawing 200 illustrating an example in which an external synchronization source is used in exemplary peer to peer system 100 of FIG. 1 to provide a high level of synchronization among peer to peer devices. This allows peer to peer devices to reduce monitoring intervals and increase sleep time, e.g., resulting in reduced battery consumption. In this example, GPS satellites (122, 124) transmit GPS signals (202, 204), respectively. Device 2 104 includes an external synchronization source receiver module, e.g., a GPS processing module. External synchronization source receiver module 128 of device 2 104 receives GPS signals (202, 204) and determines synchronization with respect to a GPS time reference. Device 2 104 generates and transmits beacon signal 206 which communicates timing synchronization information. Beacon signal 206 also communicates information 208 indicating that the timing synchronization information being communicated in beacon signal 206 is based on direct GPS reception.

Transmitted beacon signal 206 is detected by device 3 106. Device 3 106 achieves a high level of timing synchronization based on timing information communicated by beacon 206. Device 3 106 generates beacon signal 210 communicating timing synchronization information. Beacon signal 210 also communicates information 212 indicating that the timing synchronization information being communicated in beacon signal 210 is based on a received relay synchronization beacon, e.g., secondhand information.

Beacon signal 210 is received and recovered by device 1 102 and device N 116. Devices (102, 116) use the timing synchronization information communicated by beacon signal 210 to achieve a high level of timing synchronization. Devices (102, 116) recover the information 212 indicating that the device which generated beacon signal 212 did not directly receive the GPS signal on which the timing synchronization is being based. Therefore devices (102, 116) do not generate and transmit beacon signals to further propagate the timing synchronization information.

Device 5 110 also receives and recovers beacon signal 206. However, device 5 110 has been monitoring its battery status and its current battery status=low as indicated by block 214. Therefore device 5 110 decides not to generate and transmit a beacon signal to propagate timing synchronization information. In this way, device 5 110 conserves its remaining battery energy.

Device 7 114 also receives and recovers beacon signal 206. However, the received beacon signal power level is high, e.g., above a predetermined threshold, as indicated by block 216. Therefore device 7 114 decides not to generate and transmit a beacon signal to propagate timing synchronization information. Device 7 114 expects that there would be substantial overlap, with regard to coverage range, with beacon 206, if device 7 114 were to transmit a beacon. Thus device 7 114 does not waste its battery energy by transmitting an unnecessary beacon.

Figure 3:
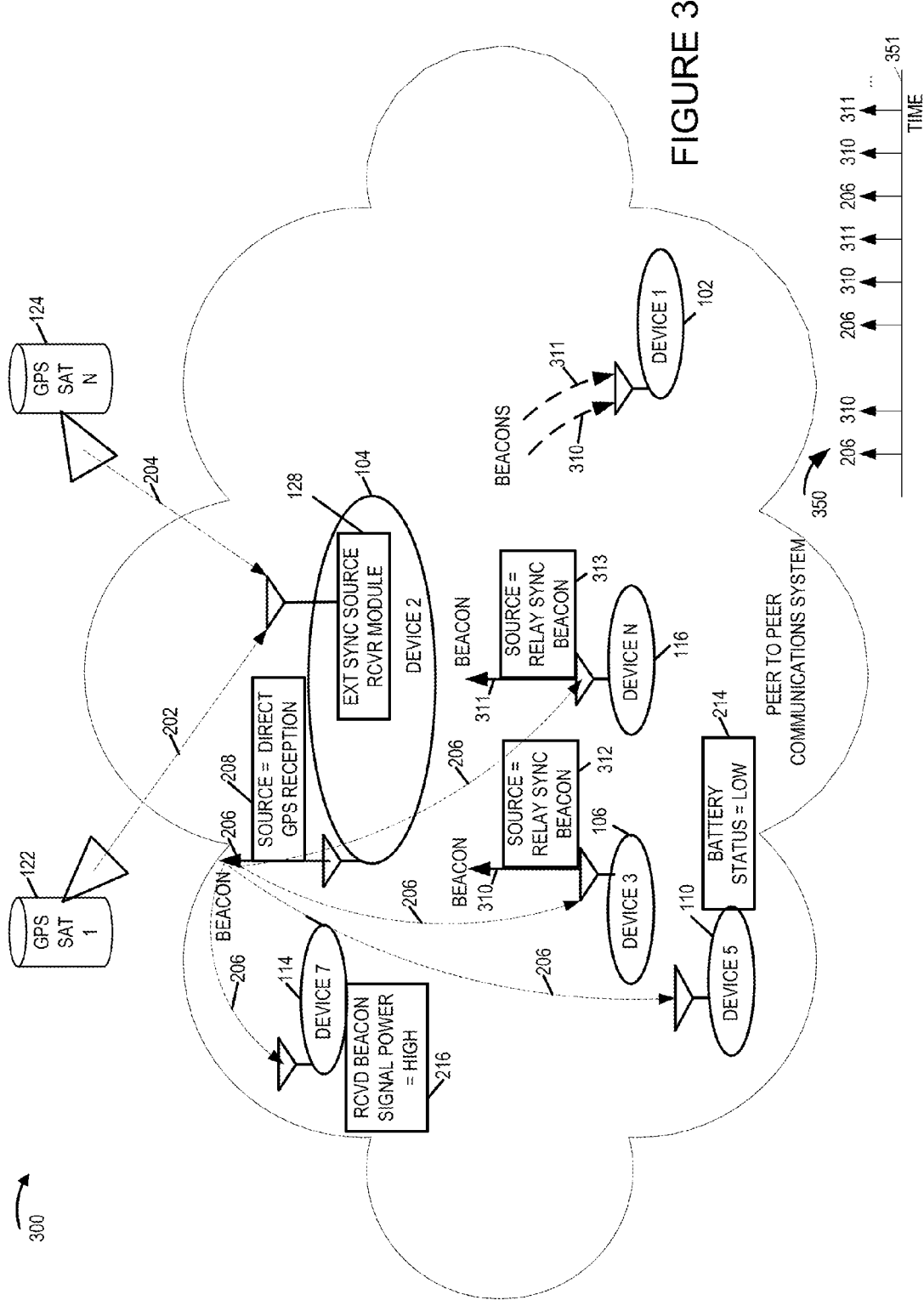
FIG. 3 is a drawing illustrating another example in which an external synchronization source is used in exemplary peer to peer system of FIG. 1 to provide a high level of synchronization among peer to peer devices.

FIG. 3 is a drawing 300 illustrating another example in which an external synchronization source is used in exemplary peer to peer system 100 of FIG. 1 to provide a high level of synchronization among peer to peer devices. In this example, GPS satellites (122, 124) transmit GPS signals (202, 204), respectively. Device 2 104 includes an external synchronization source receiver module, e.g., a GPS processing module. External synchronization source receiver module 128 of device 2 104 receives GPS signals (202, 204) and determines synchronization with respect to a GPS time reference. Device 2 104 generates and transmits beacon signal 206 which communicates timing synchronization information. Beacon signal 206 also communicates information 208 indicating that the timing synchronization information being communicated in beacon signal 206 is based on direct GPS reception by device 2 104.

Transmitted beacon signal 206 is detected by device 3 106, device 5 110, device 7 114 and device N 116. Device 3 achieves a high level of timing synchronization based on timing information communicated by beacon 206. Device 3 106 generates beacon signal 310 communicating timing synchronization information. Beacon signal 310 also communicates information 312 indicating that the timing synchronization information being communicated in beacon signal 310 is based on a received relay synchronization beacon, e.g., secondhand information. In some embodiments, a device which decides to transmit a timing synchronization beacon, selects a time interval in a recurring timing structure to transmit its beacon which complements other beacons which are already being transmitted. For example, device 3 may select to transmit its beacons at predetermined intervals which are non-overlapping with those of beacon 206 from device 2 104.

Device N 116 achieves a high level of timing synchronization based on timing information communicated by beacon 206. Device N 116 generates beacon signal 311 communicating timing synchronization information. Beacon signal 311 also communicates information 313 indicating that the timing synchronization information being communicated in beacon signal 311 is based on a received relay synchronization beacon, e.g., secondhand information. In some embodiments, a device which decides to transmit a timing synchronization beacon, selects a time interval in a recurring timing structure to transmit its beacon which complements other beacons which are already being transmitted. For example, device 3 106 may select to transmit its beacons at predetermined intervals which are non-overlapping with those of beacon 206 from device 2 104.

Device 5 110 has been monitoring its battery status and its current battery status=low as indicated by block 214. Therefore device 5 110 decides not to generate and transmit a beacon signal to propagate timing synchronization information. In this way, device 5 110 conserves its remaining battery energy.

At device 7 114, the received beacon signal power level corresponding to the beacon 206 is high, e.g., above a predetermined threshold, as indicated by block 216. Therefore device 7 114 decides not to generate and transmit a beacon signal to propagate timing synchronization information. Device 7 114 expects that there would be substantial overlap, with regard to coverage range, with beacon 206, if device 7 114 were to transmit a beacon. Thus device 7 114 does not waste its battery energy by transmitting an unnecessary beacon.

Figure 4:
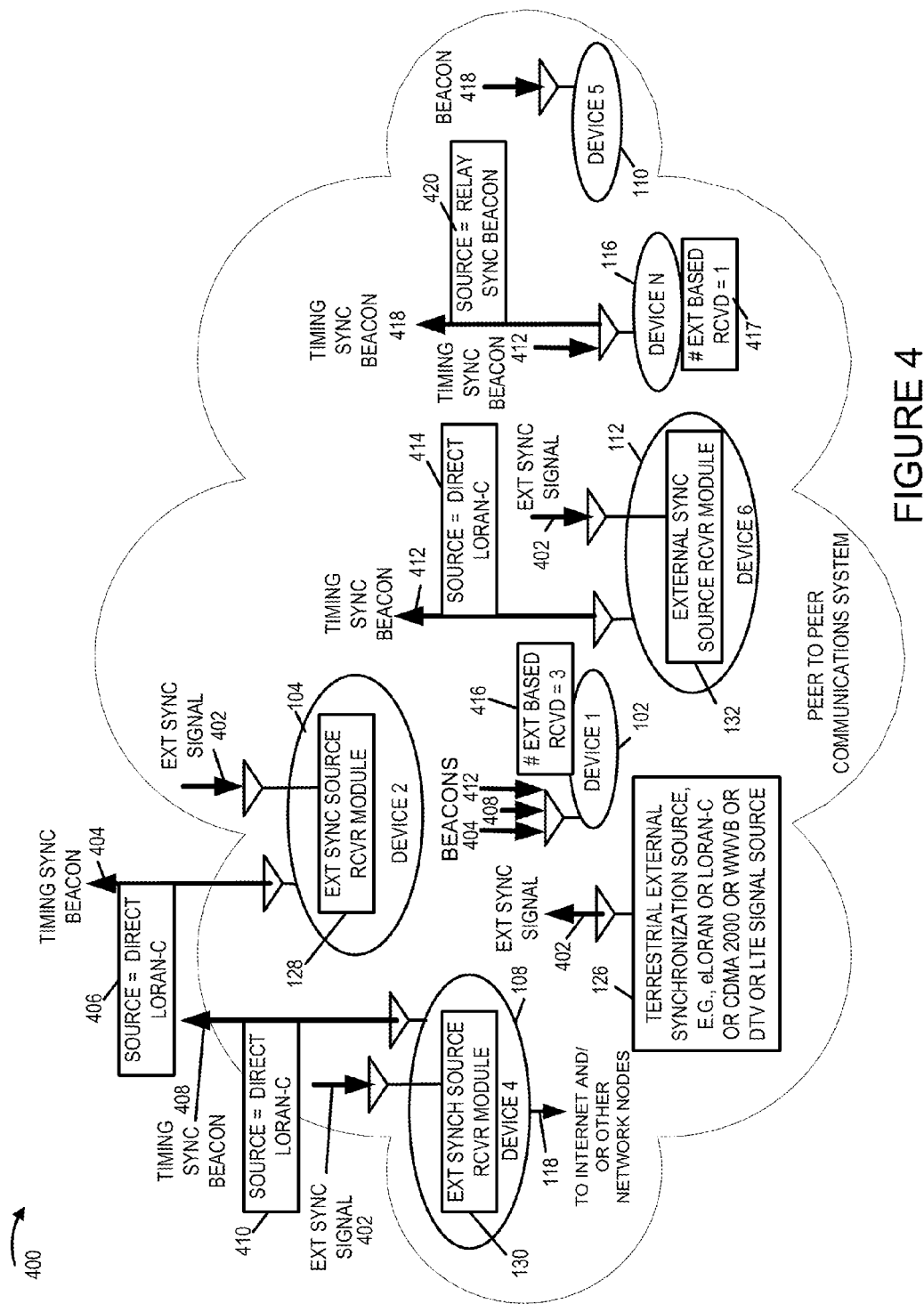
FIG. 4 is a drawing illustrating another example in which an external synchronization source is used in exemplary peer to peer system of FIG. 1 to provide a high level of synchronization among peer to peer devices.

FIG. 4 is a drawing 400 illustrating another example in which an external synchronization source is used in exemplary peer to peer system 100 of FIG. 1 to provide a high level of synchronization among peer to peer devices. In this example, terrestrial external synchronization source 126, e.g., an eLORAN or LORAN-C or CDMA 2000 or WWVB signal or DTV signal or LTE signal source, transmits external synchronization signal 402. For purposes of this example, consider that signal 402 is a LORAN-C signal.

Device 2 104 includes an external synchronization source receiver module 128. External synchronization source receiver module 128 of device 2 104 receives external synchronization signal 402 and determines synchronization with respect to the LORAN-C reference. Device 2 104 generates and transmits beacon signal 406 which communicates timing synchronization information. Beacon signal 406 also communicates information 408 indicating that the timing synchronization information being communicated in beacon signal 406 is based on direct reception of a LORAN-C signal by device 2 104.

Device 4 108 includes an external synchronization source receiver module 130. External synchronization source receiver module 130 of device 4 108 receives external synchronization signal 402 and determines synchronization with respect to the LORAN-C reference. Device 4 108 generates and transmits beacon signal 408 which communicates timing synchronization information. Beacon signal 408 also communicates information 410 indicating that the timing synchronization information being communicated in beacon signal 408 is based on direct reception of a LORAN-C signal by device 4 108.

Device 6 112 includes an external synchronization source receiver module 132. External synchronization source receiver module 132 of device 6 112 receives external synchronization signal 402 and determines synchronization with respect to the LORAN-C reference. Device 6 112 generates and transmits beacon signal 412 which communicates timing synchronization information. Beacon signal 412 also communicates information 414 indicating that the timing synchronization information being communicated in beacon signal 412 is based on direct reception of a LORAN-C signal by device 6 112.

Transmitted beacon signals (404, 408, 412) are detected by device 1 102. Device 1 102 achieves a high level of timing synchronization based on timing information communicated by beacons (404, 408, 412). Device 1 102 determines that the number of received timing synchronization signals which were generated based on direct reception of an external synchronization signal is three, as indicated by box 416. Device 1 102 makes a decision whether or not to transmit a timing synchronization beacon as a function of the determined number of received timing synchronization signals which were generated based on direct reception of an external synchronization signal. In this example, consider that when the determined number is greater than or equal to 3, device 1 102 decides to refrain from transmitting a timing synchronization beacon, so in this example, device 1 102 does not transmit a timing synchronization beacon. The rationale for this approach is that there is a sufficient number of timing synchronization beacons based on direct reception of an external signal source in the vicinity of device 1 102 to support the transfer of timing synchronization information to other devices in the vicinity which do not include an external synchronization source receive module. If device 1 102 were to generate and transmit a timing synchronization beacon, the timing synchronization information communicated would secondhand timing information. The timing synchronization information from a relay type beacon from device 1 102, in general, would be less accurate that from a beacon generated based on direct reception of the external timing signal. In addition, a beacon from device 102 would occupy valuable air link resources with little or no potential benefit.

Transmitted beacon signal 412 is detected by device N 116. Device N 116 achieves a high level of timing synchronization based on timing information communicated by beacons 412. Device N 116 determines that the number of received timing synchronization signals which were generated based on direct reception of an external synchronization signal is one, as indicated by box 417. Device N 116 makes a decision whether or not transmit a timing synchronization beacon as a function of the determined number of received timing synchronization signals which were generated based on direct reception of an external synchronization signal. In this example, consider that when the determined number is greater than or equal to 3, device N 116 decides to refrain from transmitting a timing synchronization beacon. So in this example, device N 116 generates and transmits a timing synchronization beacon 418. Beacon 418 includes information 420 indicating that the source of the timing synchronization beacon is a received relay synchronization beacon and not direct reception of the external synchronization signal 402 by device N 116.

Device 5 110 receives beacon signal 418. Device 5 110 achieves a high level of timing synchronization based on timing information communicated by beacons 418. Device 5 110 recovers the information 420 from beacon signal 418 indicating that beacon signal 418 is based on a received relay synchronization beacon. In such a scenario device 5 determines not to generate and transmit a timing synchronization beacon. In general, in a relay process of communicating timing synchronization information, degradation in the level of timing synchronization information with respect to the external source may be expected for each stage. In this example, the first device in the chain, once removed from direct reception of the external synchronization signal, is conditionally allowed to transmit a timing synchronization beacon. However, a device twice in the chain is not permitted to further propagate the timing synchronization information in a beacon signal.

In some other embodiments, a higher level of propagation of timing synchronization is allowed. For example, in one such embodiment, a device twice removed from direct reception of the external timing synchronization source is also conditionally permitted to transmit a timing synchronization beacon signal, but a device three times removed from direct reception of the external timing synchronization signal is not allowed to further propagate timing synchronization information. In some such embodiments a timing synchronization beacon communicates information indicating whether the timing synchronization beacon was generated by a device which directly received the external synchronization signal or whether it is based upon relayed timing synchronization information. In some such embodiments, a timing synchronization beacon further communicates, when the beacon is based upon relayed timing synchronization information, a level of distance from the external synchronization source, e.g., once removed or twice removed.

Figure 5B:
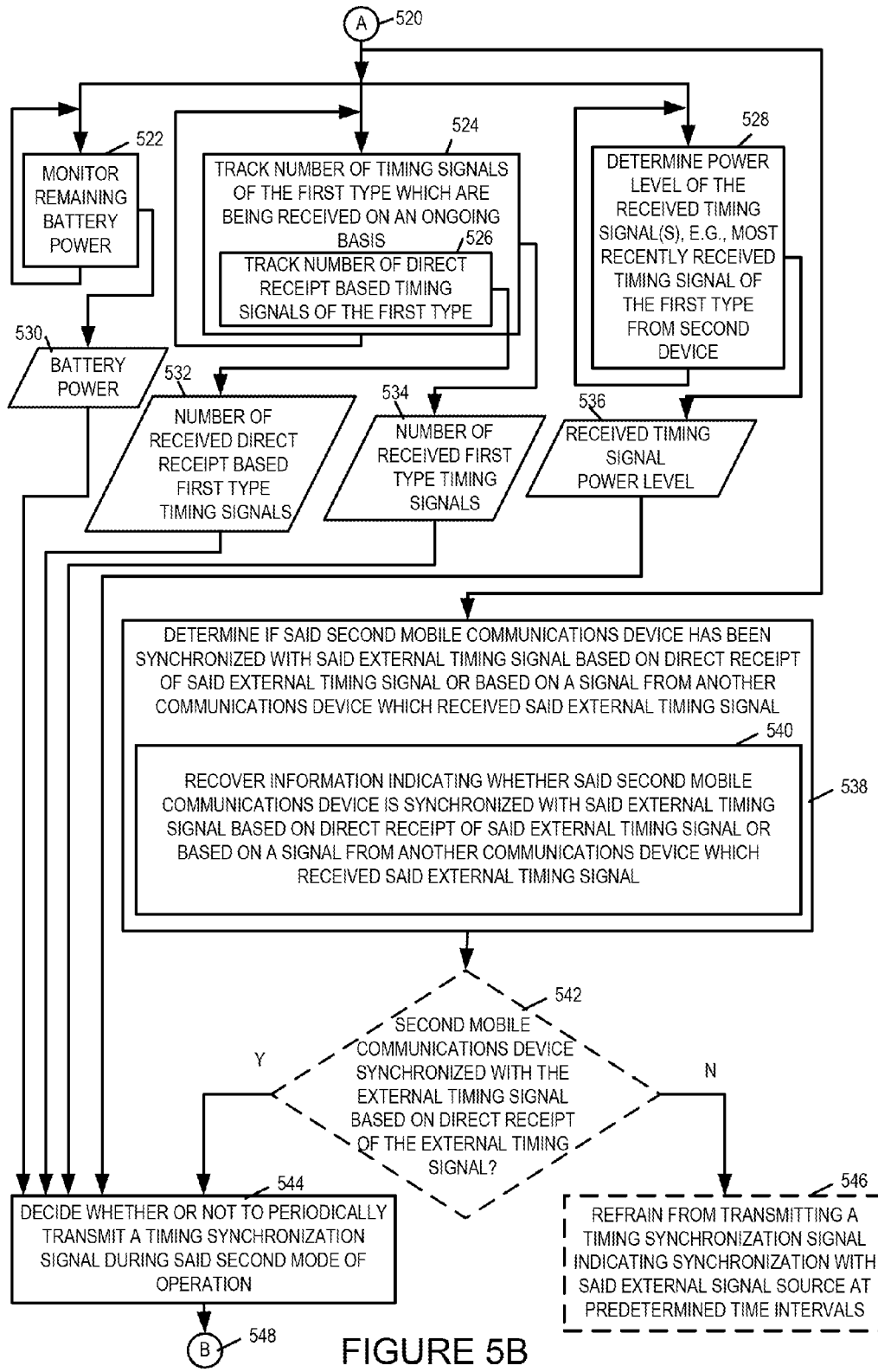
FIG. 5B is a second part of a flowchart of an exemplary method of operating a first mobile communications device operating in an unlicensed frequency band in accordance with an exemplary embodiment.
Figure 5C:
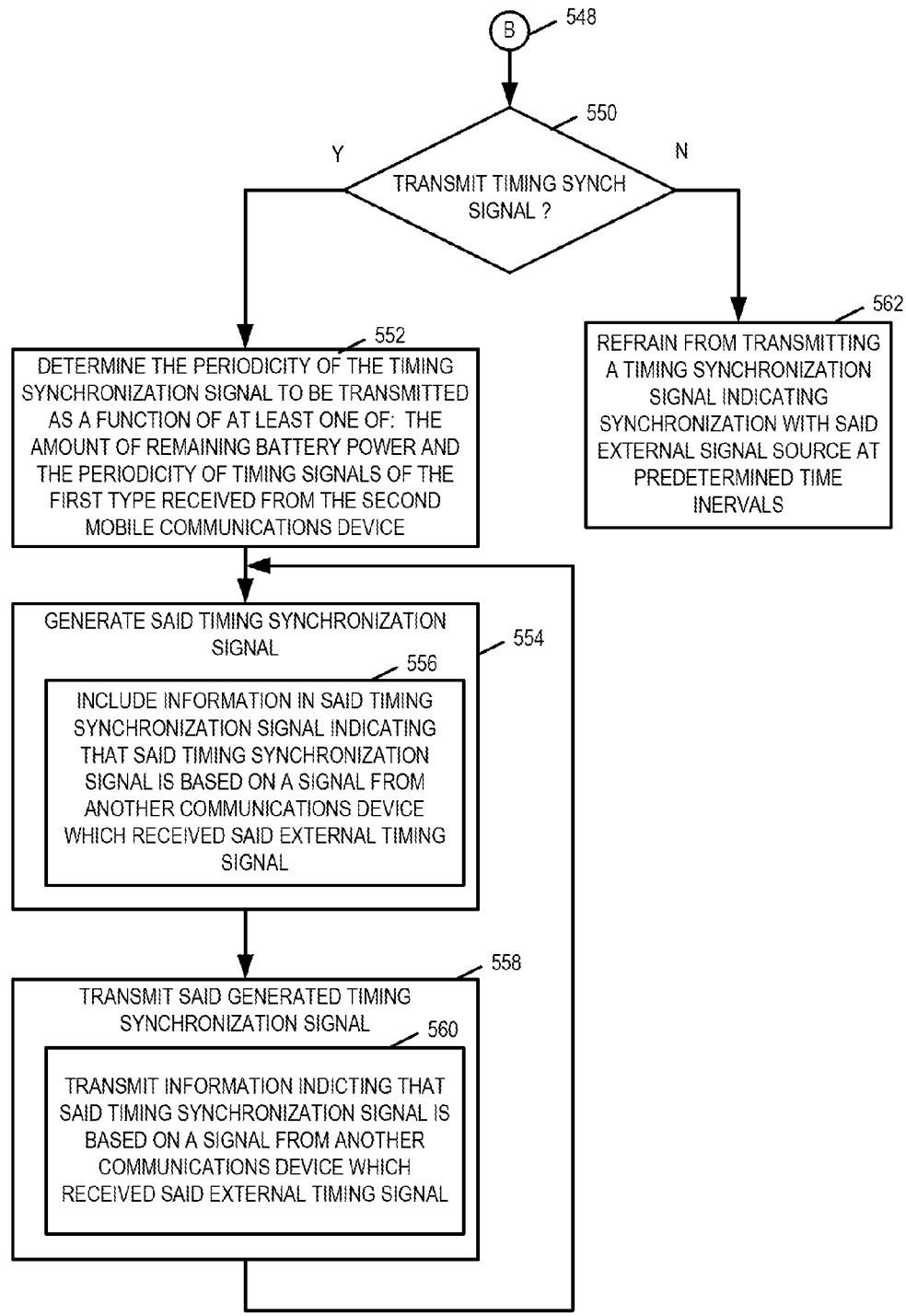
FIG. 5C is a third part of a flowchart of an exemplary method of operating a first mobile communications device operating in an unlicensed frequency band in accordance with an exemplary embodiment.
Figure 5D:
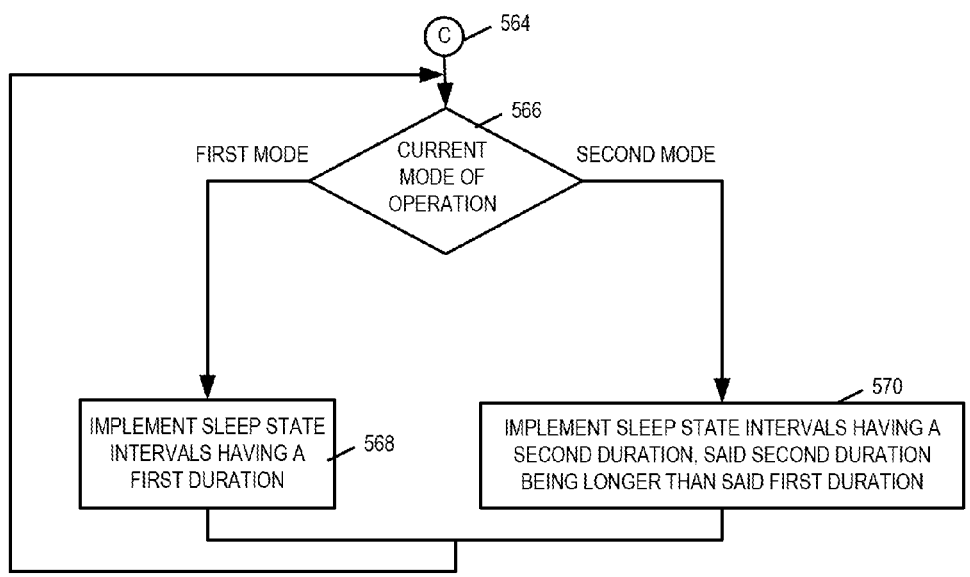
FIG. 5D is a fourth part of a flowchart of an exemplary method of operating a first mobile communications device operating in an unlicensed frequency band in accordance with an exemplary embodiment.

FIG. 5, comprising the combination of FIG. 5A, FIG. 5B, FIG. 5C and FIG. 5D, is a flowchart 500 of an exemplary method of operating a first mobile communications device operating in an unlicensed frequency band in accordance with an exemplary embodiment. Operation starts in step 502, where the first communications device is powered on and initialized. Operation proceeds from step 502 to step 504. Operation also proceeds from step 502 to step 566 via connecting node C 564.

Returning to step 504, in step 504 the first mobile communications device, while operating in a first mode of operation, receives a timing signal of a first type from a second mobile communications device, said first type of timing signal being synchronized to a global timing signal source. In some embodiments, the timing signal of the first type from the second mobile communications device communicates timing information which is transmitted by the second mobile communications device after having achieved synchronization with an external timing signal. In some such embodiments, the external timing signal is one of a global positioning signal, eLoran signal, LORAN-C signal, CDMA 2000 signal, WWVB signal, DTV signal and LTE signal. In some embodiments, the first mobile communications device does not include a receiver for receiving the external timing signal.

In various embodiments, the timing signal of the first type from the second mobile communications device is received in said unlicensed frequency band. In some embodiments, the timing signal of the first type from the second mobile communications device is received in a beacon signal. In some embodiments, said beacon signal communicates an 802.11 beacon frame. In other embodiments, said beacon signal is a narrowband high power signal. In various embodiments, said beacon signal is a signal designed to provide timing and/or frequency synchronization. In some embodiments, the beacon signal is a WiFi compliant signal. In some embodiments, the beacon signal expressly indicates that the beacon signal is synchronized to a global timing signal. In some such embodiments, the global timing signal is a global positioning signal. In some embodiments the beacon signal communicates beacon periodicity information. In some such embodiments, the beacon periodicity information is the period of the beacon signal. In various embodiments, the communicated beacon periodicity information identifies one of a plurality of predetermined alterative beacon periods. A device recovering the beacon periodicity information can use the beacon periodicity information to determine sleep times and when to awake, e.g. thus conserving power. Operation proceeds from step 504 to step 506.

In step 506, the first mobile communications device synchronizes an internal clock based on the received timing signal from the second mobile communications device. Operation proceeds from step 506 to step 508. In step 508 the first mobile communications device switches to a second mode of operation wherein sleep state intervals in said second mode of operation are longer in duration than sleep state intervals in said first mode of operation. In some embodiments, sleep state intervals in the second mode of operation are 10 times longer than sleep state intervals in the first mode of operation. In some such embodiments, sleep state intervals in the second mode of operation are 20, 30, 40 or even 50 times longer than sleep state intervals in the first mode of operation. In some embodiments, when in the second mode of operation the first mobile communications device has at least on average, 10 times the amount of sleep time than when in the first mode of operation. In some embodiments, the amount of sleep time when in the second mode of operation is at least 20, 30, 40 or even 50 times, on average, that which occurs when the first mobile communications device is in the first mode of operation. In some embodiments, the first mode of operation is a first synchronized mode of operation, and the second mode of operation is a second synchronized mode of operation, and the first synchronized mode of operation corresponds to a lower level of synchronization than said second synchronized mode of operation. Operation proceeds from step 508 to step 510 and from step 508 to steps 522, 524, 528, and step 538 via connecting node A 520.

Returning to step 510, in step 510 the first mobile communications device monitors for the timing signal of the first type from the second mobile communications device. Step 510 may, and sometimes does, include step 512 in which the first mobile communications device receives the timing signal of the first type from the second mobile communications device. Operation proceeds from step 512 to step 514.

In step 514 the first mobile communications device is operated to proceed differently based on whether or not the timing signal of the first type from the second mobile communications device has been detected by the monitoring of step 510. If the timing signal of the first type from the second mobile communications device has been received then, operation proceeds from step 514 to step 510 for additional monitoring and the first mobile communications device remains in the second mode of operation. However, if the timing signal of the first type has not been received from the second mobile communications device in the monitoring of step 510, then operation proceeds from step 514 to step 516.

In step 516 the first mobile communications device switches to the first mode of operation. Operation proceeds from step 516 to step 518. In step 518 while in said first mode of operation the first mobile communications device synchronizes with other devices based on second type timing signals. In some embodiments, a second type timing signal is timing signal, e.g., a beacon signal, which is not synchronized to global timing signal source. The second type timing signal, in some embodiments, may be sourced from another device or from the first mobile communications device. For example, if the first mobile communications device detects a first type timing signal from another device in its vicinity, it may use that received signal for synchronization. However, if the first mobile communications device does not detect a first type timing signal it may generate and transmit a first type timing signal, which other devices may use as a reference for synchronization. While in the first mode of operation, the first mobile communications device, in some embodiments, monitors for first type timing signals from other devices. In some such embodiments, upon reception of a timing signal of the first type, the first mobile communications device synchronizes its internal clock based on the received timing signal of the first type and switches to the second mode of operation.

Returning to step 566, in step 566 the first mobile communications device determines its current mode of operation and proceeds as a function of the determination. If the current mode of operation is the first mode of operation, then operation proceeds from step 566 to step 568 in which the first mobile communications device implements sleep state intervals having a first duration. However, if the current mode of operation is the second mode of operation, then operation proceeds from step 566 to step 570 in which the first mobile communications device implements sleep state intervals having a second duration, said second duration being longer than said first duration. Operation proceeds from step 568 or step 570 to step 566.

Returning to step 522, in step 522 which is performed on an ongoing basis, the first mobile communications device monitors remaining battery power. Battery power 530 is an output of step 522.

In step 524, which is performed on an ongoing basis, the first mobile communications device tracks the number of timing signals of the first type which are being received on an ongoing basis. Step 524 includes step 526 in which the first mobile communications device tracks the number of timing signals of the first type which are being received on an ongoing basis from other communications devices which are synchronized with the external timing signal based on direct receipt of the external timing signal. In this exemplary embodiment, there are two sub-categories of timing signals of a first type based on whether or not the device transmitting the first type timing signal has directly received the external timing signal which is the reference source signal. Number of received direct receipt based first type timing signals 532 is an output of step 526. Number of received first type timing signals 534 is an output of step 524.

In step 528, which is performed on an ongoing basis, the first mobile communications device determines the power level of received timing signals, e.g., the power level of the most recently received timing signal of the first type from the second mobile communications device. Received timing signal power level 536 is an output of step 528.

Returning to step 538, in step 538 the first mobile communications device determines if said second mobile communications has been synchronized with said external timing signal based on direct receipt of said external timing signal or based on a signal from another communications device which received the external timing signal. In some embodiments, the basis for the timing synchronization is communicated by information transmitted by the second mobile communications device. In some such embodiments, the timing signal of the first type from the second mobile communications device is a beacon signal which includes information indicating a timing synchronization basis used to control the transmission of the timing of the beacon signal. Step 538 includes sub-step 540 in which the first mobile communications device recovers information indicating whether said second mobile communications device is synchronized with said external timing signal based on direct receipt of said external timing signal or based on a signal from another communications device which received said external signal timing signal. In some embodiments, step 540 includes processing, e.g., decoding, the received timing signal of the first type of the second mobile communications device. Steps 542 and 546 are optional steps which are included in some embodiments. In embodiments, in which steps 542 and 546 are omitted, operation proceeds from step 538 to step 544. In embodiments, in which steps 542 and 546 are included, operation proceeds from step 538 to step 542.

If the determination of step 538 is that the second mobile communications device was synchronized with the external timing signal based on direct receipt of the external timing signal, then operation proceeds from step 542 to step 544. In step 544 the first mobile communications device decides whether or not to periodically transmit a timing synchronization signal during said second mode of operation. Battery power 532, number of received direct receipt based first type of timing signals 532, number of received first type timing signals 534 and received timing signal power level 536 are inputs to step 544 and used in the decision process of step 544. In some embodiments, the decision whether or not to periodically transmit a timing synchronization signal is a function of remaining battery power. For example, if remaining battery power is below a threshold the first mobile communications device decides not to transmit the timing synchronization signal. In various embodiments, the decision whether or not to transmit the timing synchronization signal is a function of the strength of the timing signal of the first type received from the second mobile communications device. For example, if the received timing signal of the first type from the second mobile communications device is above a certain threshold power level, e.g., a predetermined power threshold level, the first mobile communications device, in some embodiments, determines not to transmit the timing synchronization signal since it is likely that there will be substantial overlap in the coverage areas of the timing synchronization signal of the first type from the second mobile communications device and a transmitted timing synchronization signal from the first mobile communications device. In some embodiments, the decision whether or not to transmit a timing synchronization signal is a function of the number of timing synchronization signal of the first type being received on a periodic basis from other communications devices. In some embodiments, the decision whether or not to transmit a timing synchronization signal is a function of the number of timing synchronization signal of the first type, communicating direct reception of the external timing signal, being received on a periodic basis from other communications devices. Operation proceeds from step 544 via connecting node B 548 to step 550.

If the determination of step 544 was to transmit the timing synchronization signal, then operation proceeds from step 550 to step 552. However, if the determination of step 544 was to refrain from transmitting a timing synchronization signal then operation proceeds from step 550 to step 562. In step 562 the first mobile communications device is controlled to refrain from transmitting a timing synchronization signal indicating synchronization with said external source at predetermined time intervals.

Returning to step 552, in step 552 the first mobile communications device determines the periodicity of the timing synchronization signal to be transmitted as a function of at least one of: the amount of remaining battery power and the periodicity of timing signals of the first type received from the second mobile communications device. In some such embodiments, the first mobile communications device determines the periodicity of the timing synchronization signal to be transmitted as a function of at least one of: the amount of remaining battery power and the periodicity of timing signals of the first type received from a plurality of communications device including the second mobile communications device. In some embodiments, when the remaining battery power is below a threshold, the first mobile communications device transmits at a lower frequency to conserve power than when the remaining battery power is above the threshold. In various embodiments, there are multiple power threshold levels corresponding to a plurality of rate transition points. In some embodiments, the first mobile communications device determines to transmit the timing synchronization signal in a manner that complements other received timing synchronization signals. For example, the first mobile communications device transmits the timing synchronization signal at a spacing and/or interval period so as to fill in between the received timing signals of the first type from the second mobile communications device. In some embodiments, the determination of step 552 includes identifying specific intervals or specific positions in a recurring peer to peer timing structure during which the first mobile communications device is to transmit a generated timing synchronization signal. The timing synchronization signal is, e.g., a timing signal of the first type which does not indicate direct reception of the external timing signal by the first mobile communications device. Operation proceeds from step 552 to step 554.

In step 554 the first mobile communications device generates said timing synchronization signal. Step 554 includes step 556 in which the first mobile communications device includes information indicating that said timing synchronization signal is based on a signal from another communications device which received said external timing signal. Operation proceeds from step 554 to step 558.

In step 558 the first mobile communications device transmits the generated timing synchronization signal. Step 558 includes step 560 in which the first mobile communications device transmits information indicating that said timing synchronization signal is based on a signal from another communications device which received said external timing signal. Operation proceeds from step 558 to step 554. The transmitting of step 558 is performed at times in accordance with the determination of step 552.

Returning to step 546, if the determination of step 538 is that the second mobile communication device has not been synchronized with the external timing signal based on direct reception of the external timing signal, then operation proceeds from step 542 to step 546. In step 546 the first mobile communications device is controlled to refrain from transmitting a timing synchronization signal indicating synchronization with said external timing source at predetermined time intervals.

Figure 6:
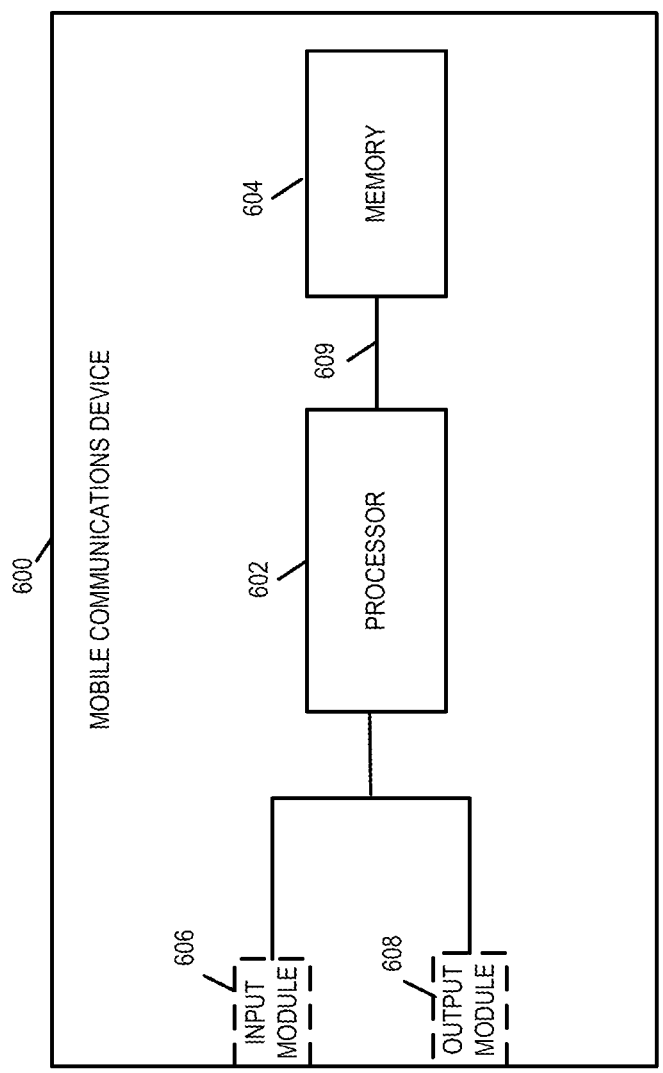
FIG. 6 is a drawing of an exemplary mobile communications device, in accordance with an exemplary embodiment.

FIG. 6 is a drawing of an exemplary mobile communications device 600, in accordance with an exemplary embodiment. Exemplary mobile communications device 600 is, e.g., one of the wireless communications devices of FIG. 1. Exemplary mobile communications device 600 may, and sometimes does, implement a method in accordance with flowchart 500 of FIG. 5.

Mobile communications device 600 includes a processor 602 and memory 604 coupled together via a bus 609 over which the various elements (602, 604) may interchange data and information. Communications device 600 further includes an input module 606 and an output module 608 which may be coupled to processor 602 as shown. However, in some embodiments, the input module 606 and output module 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output.

Processor 602 is configured to: receive a timing signal of a first type from a second mobile communications device while operating in a first mode of operation, said first type of timing signal being synchronized to a global timing signal source; synchronize an internal clock based on the received timing signal from the second mobile communications device; and switch to a second mode of operation wherein sleep state intervals in said second mode of operation are longer in duration than sleep state intervals in said first mode of operation, after synchronizing the internal clock.

In some embodiments, said first mode of operation is a first synchronized mode of operation and wherein said second module of operation is a second synchronized mode of operation, and wherein said first synchronized mode of operation corresponds to a lower level of synchronization than said second synchronized mode of operation. In some embodiments, said timing signal from the second mobile communications device communicates timing information which is transmitted by the second communications device after having achieved synchronization with an external timing signal. In various embodiments, said external timing signal is one of a global positioning signal, eLoran signal, LORAN-C signal, CDMA 2000 signal, WWVB signal, DTV signal and LTE signal.

Processor 602 is further configured to: determine if said second communications device has been synchronized with said external timing signal based on direct receipt of said external timing signal or based on a signal from another communications device which received said external timing signal. The basis for timing synchronization, in some embodiments, is communicated by information transmitted by said second mobile communications device. In various embodiments, said timing signal from the second mobile communications device is a beacon signal which includes information indicating a timing synchronization basis used to control the transmission timing of the beacon signal.

Processor 602 is further configured to: decide whether or not to periodically transmit a timing synchronization signal during said second mode of operation, when it is determined that said second communications device is synchronized with the external timing signal based on direct receipt of said external timing signal. In some embodiments, processor 602 is further configured to decide whether or not to periodically transmit a timing synchronization signal as a function of: remaining battery power, as part of being configured to decide whether or not to periodically transmit a timing synchronization signal during said second mode of operation. For example, in some embodiments, processor 602 is configured not to transmit the timing synchronization signal if remaining battery power is below a threshold to conserve power. In some embodiments, processor 602 is further configured to decide whether or not to periodically transmit a timing synchronization signal as a function of: the strength of the timing signal received from the second mobile communications device, as part of being configured to decide whether or not to periodically transmit a timing synchronization signal during said second mode of operation. For example, in some embodiments processor 602 is configured not to transmit the timing synchronization signal if the received power level of the received timing signal from the second mobile communications device is above a certain threshold, e.g., a predetermined threshold level, since if it is above the threshold it is likely that there will be substantial overlap in the coverage area of the timing signal from the second mobile communications device and a timing synchronization signal transmitted from the first mobile communications device. In some embodiments, processor 602 is further configured to decide whether or not to periodically transmit a timing synchronization signal as a function of: a number of first type timing signals being received on a periodic basis from other communications devices which are synchronized with said external signal based on receipt of said external timing signal, as part of being configured to decide whether or not to periodically transmit a timing synchronization signal during said second mode of operation. In some embodiments, processor 602 is further configured to decide whether or not to periodically transmit a timing synchronization signal as a function of: a number of first type timing signals being received on a periodic basis from other communications devices, as part of being configured to decide whether or not to periodically transmit a timing synchronization signal during said second mode of operation.

Processor 602 is further configured to determine the periodicity of the timing synchronization signal to be transmitted as a function of at least one of: the amount of remaining battery power; and the periodicity of timing signals of the first type received from said second mobile communications device (e.g., transmit sync signal in a manner that compliments received sync signals, e.g., at a spacing and interval period that fills in between signals from the second device), when it is decided to periodically transmit a timing synchronization signal at predetermined intervals. For example, processor 602 is configured to transmit the timing synchronization signal at a first rate when the remaining power level is below a threshold to conserve power, and to transmit the timing synchronization signal at a second rate when remaining power level is above the threshold, wherein the first rate is lower than the second rate. In some embodiments, processor 602 is configured to transmit the timing synchronization signal in a manner that complements received timing synchronization signals, e.g., processor 602 is configured to transmit the timing synchronization signal at a spacing and/or at an interval period that fills in a recurring timing structure between timing signals of the first type being received from the second mobile communications device.

Processor 602 is further configured to: transmit information indicating that said transmitted timing synchronization signal is based on a signal from another communications device which received said external timing signal. Processor 602 is further configured to: control said first mobile communications device to refrain from transmitting a timing synchronization signal indicating synchronization with said external signal source at predetermined time intervals during said second mode of operation, when it is determined that said second mobile communications device is synchronized with the external timing signal based on receipt of a timing signal from a device which did not receive said external timing signal.

Processor 602 is further configured to: switch back to said first mode of operation when said timing signal from the second mobile communications device ceases to be received.

In various embodiments, said timing signal from the second mobile communications device is received in said unlicensed frequency band, and processor 602 is configured to operate in said unlicensed frequency band. In some embodiments, said timing signal from the second mobile communications device is received in a beacon signal. In some such embodiments, said beacon signal is a WiFi compliant signal. In some embodiments, said beacon signal expressly indicates that the beacon signal is synchronized to a global timing signal.

In some embodiments, said global timing signal is a global positioning signal. In other embodiments, said global timing signal is an eLoran signal. In some other embodiments, said global timing signal is a LORAN-C signal. In some other embodiments, said global timing signal is a CDMA 2000 signal. In still another embodiment, said global timing signal is a WWVB signal. In still another embodiment the global timing signal is a DTV signal. In still another embodiment, the global timing signal is a LTE signal.

In some embodiments, device 600 does not include a receiver for receiving said external timing signal. In some embodiments processor 602 is not configured to receive said global timing signal.

Figures 7, 7A:
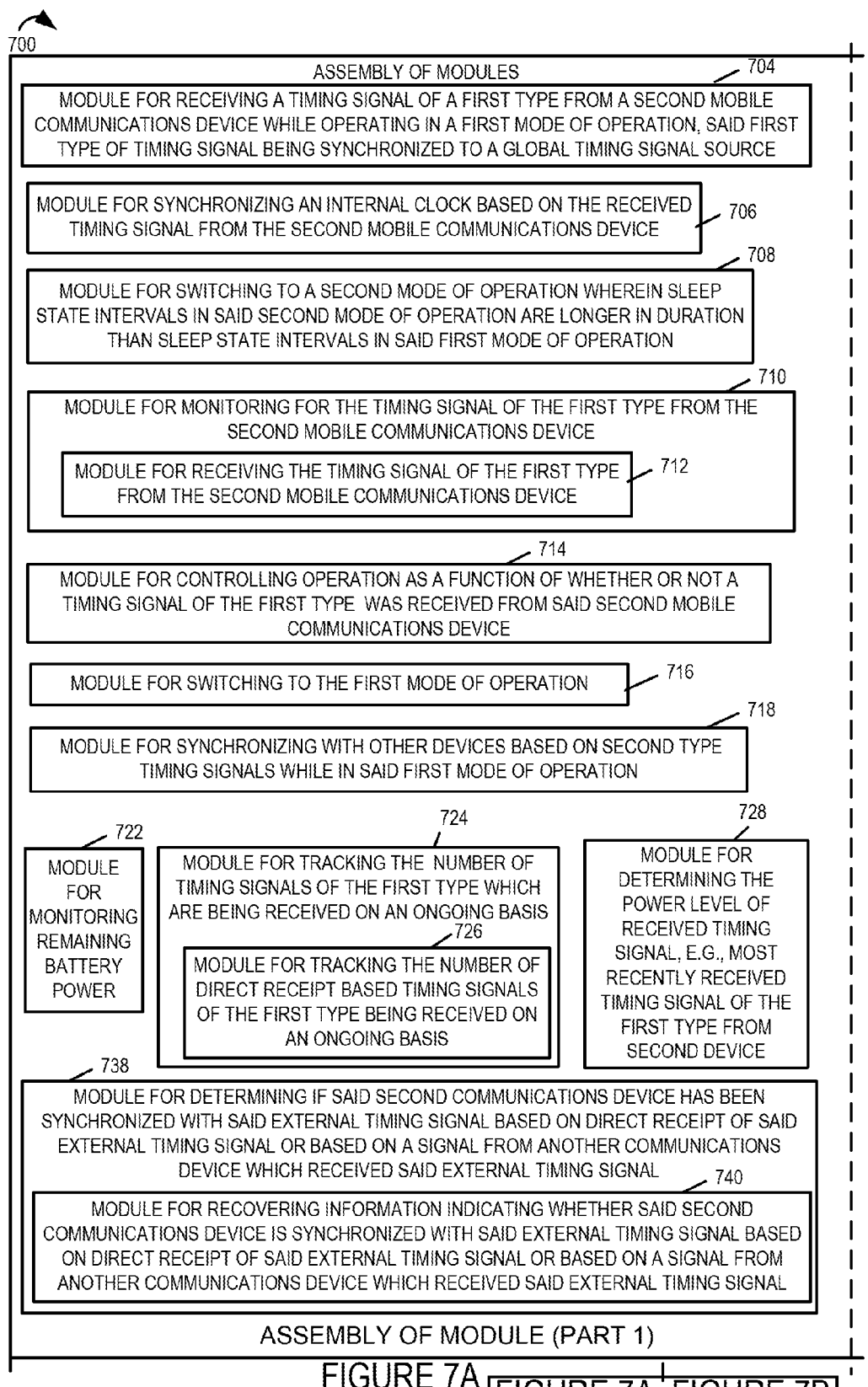
FIG. 7 is an assembly of modules which can, and in some embodiments is, used in the mobile communications device of FIG. 6.
Figure 7B:
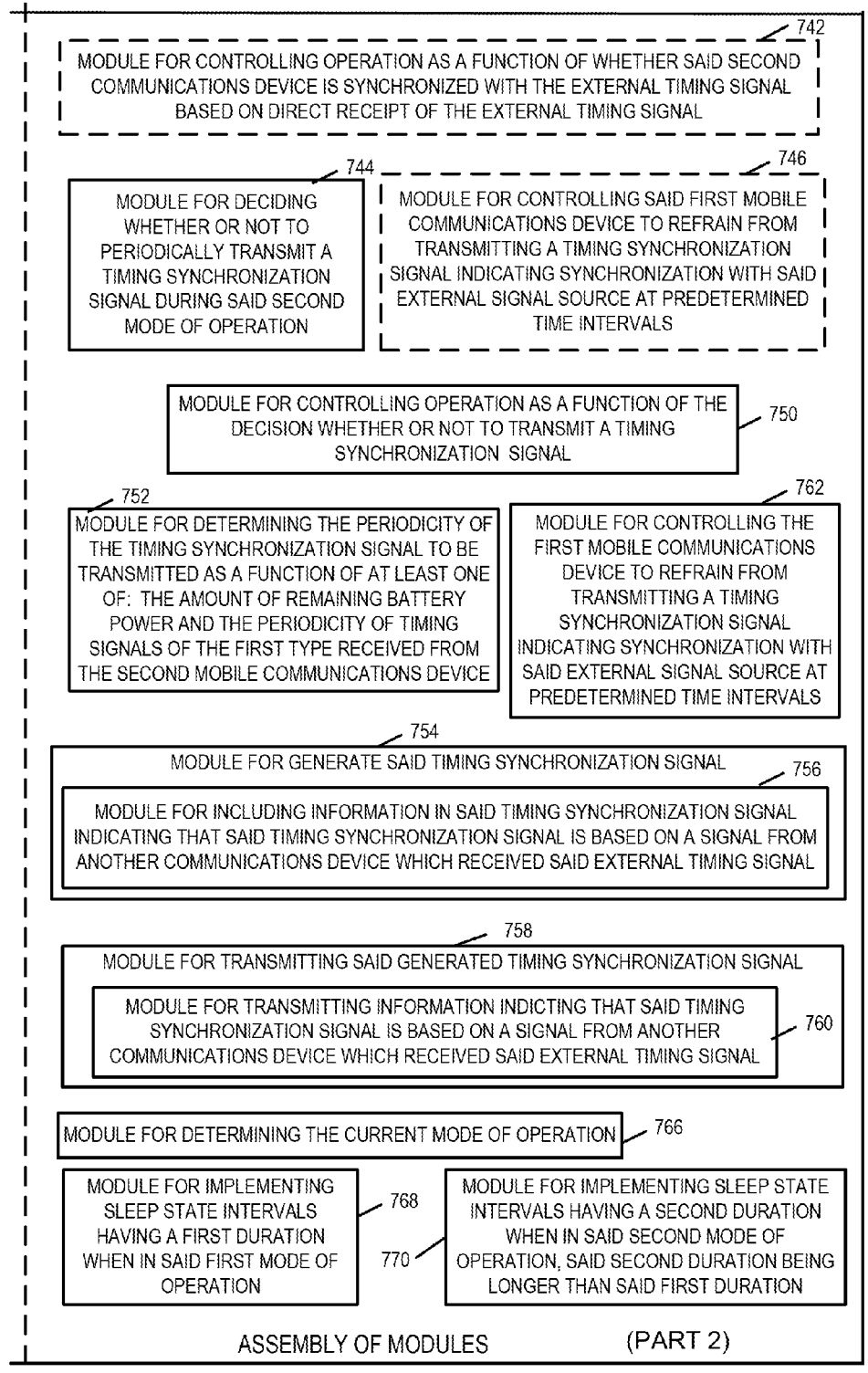

FIG. 7 is an assembly of modules 700 which can, and in some embodiments is, used in the mobile communications device 600 illustrated in FIG. 6. The modules in the assembly 700 can be implemented in hardware within the processor 602 of FIG. 6, e.g., as individual circuits. Alternatively, the modules may be implemented in software and stored in the memory 604 of the communications device 600 shown in FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In some embodiments, processor 602 is configured to implement each of the modules of the assembly of modules 700. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the communications device 600 or elements therein such as the processor 602, to perform the functions of the corresponding steps illustrated in the method flowchart 500 of FIG. 5.

Assembly of modules 700 includes a module 704 for receiving a timing signal of a first type from a second mobile communications device while operating in a first mode of operation, said first type of timing signal being synchronized to a global timing signal source, a module 706 for synchronizing an internal clock based on the received timing signal from the second mobile communications device, and a module 708 for switching to a second module of operation wherein sleep state intervals in said second state of operation are longer in duration than sleep state intervals in said first mode of operation. Assembly of module 700 further includes a module 710 for monitoring for the timing signal of the first type from the second mobile communications device, a module 714 for controlling operation as a function of whether or not a timing signal of the first type was received from the second mobile communications device, a module 716 for switching to the first mode of operation when it is determined that a timing signal of the first type was not received during monitoring, and a module 718 for synchronizing with other devices based on second type timing signals while in said first mode of operation when a timing signal of the first type is not being received during monitoring for timing signals of the first type. Module 710 includes a module 712 for receiving the timing signal of the first type from the second mobile communications device.

Assembly of modules 700 further includes a module 722 for monitoring remaining battery power, a module 724 for tracking the number of timing signals of the first type which are being received on an ongoing basis and a module 728 for determining the power level of a received timing signal, e.g., the most recently received timing signal of the first type from the second device. Module 724 includes a module 726 for tracking the number of direct receipt based timing signals of the first type being received on an ongoing basis.

Assembly of modules 700 further includes a module 738 for determining if said second communications device has been synchronized with said external timing signal based on direct receipt of said external timing signal or based on a signal from another communications device which received said external timing signal. Module 738 includes a module 740 for recovering information indicating whether said second communications device is synchronized with said external timing signal based on direct receipt of said external timing signals or based on a signal from another communications device which received said external timing signal.

Assembly of modules 700 further includes a module 742 for controlling operation as a function of whether or not said second communications device is synchronized with the external timing signal based on direct receipt of the external timing signal, a module 744 for deciding whether or not to periodically transmit a timing synchronization signal during said second mode of operation, a module 746 for controlling said first mobile communications device to refrain from transmitting a timing synchronization signal indicating synchronization with said external signal source at predetermined time intervals, a module 750 for controlling operation as a function of the decision whether or not to transmit a timing synchronization signal, a module 752 for determining the periodicity of the timing synchronization signal to be transmitted as a function of at least one of: the amount of remaining battery power and the periodicity of timing signals of the first type received from the second mobile communications device, and a module 762 for controlling the first mobile communications device to refrain from transmitting a timing synchronization signal indicating synchronization with said external signal source at predetermined time intervals.

Assembly of module 700 further includes a module 754 for generating said timing synchronization signal and a module 758 for transmitting said generated timing synchronization signal. Module 754 includes a module 756 for including information in said timing synchronization signal indicating that said timing synchronization signal is based on a signal from another communications device which received said external timing signal. Module 758 includes a module 760 for transmitting information indicating that said timing synchronization signal is based on a signal from another communications device which received said external timing signal.

Assembly of modules 700 further includes a module 766 for determining the current mode of operation, a module 768 for implementing sleep state intervals having a first duration when in said first mode of operation and a module 770 for implementing sleep state intervals having a second duration when in said second mode of operation, said second duration being longer than said first duration.

In various embodiments, the first mode of operation is a first synchronized mode of operation and the second mode of operation is a second synchronized mode of operation and the first synchronized mode of operation corresponds to a lower level of synchronization than said second synchronized mode of operation. In some embodiments, the timing signal from the second mobile communications device communicates timing information which is transmitted by the second communications device after having achieved synchronization with an external timing signal. In some embodiments the external timing signal is one of a global positioning signal, a eLoran signal, a LORAN-C signal, a CDMA 2000 signal, a WWVB signal, a DTV signal and an LTE signal. In some embodiments, the basis for timing synchronization is communicated by information transmitted by the second communications device. In some embodiments, the timing signal from the second mobile communications device is a beacon signal which includes information indicating a timing synchronization basis used to control the transmission timing of the beacon signal.

In some embodiments, module 744 makes its decision whether or not to periodically transmit a timing synchronization signal during said second mode of operation as a function of remaining battery. In some embodiments, module 744 makes its decision whether or not to periodically transmit a timing synchronization signal during said second mode of operation as a function of the strength of the timing signal received from the second mobile communications device. In some embodiments, module 744 makes its decision whether or not to periodically transmit a timing synchronization signal during said second mode of operation as a function of a number of first type timing signals being received on a periodic basis from other communications devices which are synchronized with said external signal based on receipt of said external timing signal. In some embodiments, module 744 makes its decision whether or not to periodically transmit a timing synchronization signal during said second mode of operation as a function of a number of first type timing signals being received on a periodic basis from other communications devices.

In various embodiments, the timing signal from the second mobile communications device is received in an unlicensed frequency band. In some embodiments, the timing signal from the second mobile communications device is received in a beacon signal. In some embodiments, the timing signal from the second mobile communications device is a beacon signal. In some embodiments, the beacon signal is a Wi-Fi compliant signal. In various embodiments, the beacon signal expressly indicates that the beacon signal is synchronized to a global timing signal. In some such embodiments, the global timing signal is a global positioning signal. In some embodiments, the mobile communications device including assembly of modules 700 does not include a receiver for receiving said external timing signal.

Drawing 800 of FIG. 8 shows an exemplary timing structure used by an exemplary mobile communications device in a first mode of operation in which the mobile communications is not synchronized with respect to a global timing source. The exemplary timing structure of drawing 800 includes peer discovery intervals and sleep intervals which are interweaved as shown (peer discovery interval 802, sleep interval 810, peer discovery interval 812, sleep interval 820, peer discovery interval 822, sleep interval 830, . . . ). Peer discovery interval 802 includes a listen portion 804, a transmit portion 806 and a listen portion 808, from the perspective of the exemplary mobile communications device operating in the first mode of operation. Similarly, peer discovery interval 812 includes a listen portion 814, a transmit portion 816 and a listen portion 818, from the perspective of the exemplary mobile communications device operating in the first mode of operation. Similarly, peer discovery interval 822 includes a listen portion 824, a transmit portion 826 and a listen portion 828, from the perspective of the exemplary mobile communications device operating in the first mode of operation.

In some embodiments there are multiple mobile communications devices operating in a local peer to peer network without the benefit of an external global timing synchronization sources, which are operating in the first mode of operation. In some such embodiments, one of the devices, e.g., the first device which started the local peer to peer network transmits a local beacon signal which serves as a coarse synchronization source for the other devices.

Drawing 850 of FIG. 8 shows an exemplary timing structure used by an exemplary mobile communications device in a second mode of operation in which the mobile communications is synchronized with respect to a global timing source, e.g., GPS, eLORAN, LORAN-C, CDMA2000, WWVB, DTV or LTE source. The exemplary timing structure of drawing 850 includes peer discovery intervals and sleep intervals which are interweaved as shown (peer discovery interval 852, sleep interval 860, peer discovery interval 862, sleep interval 870, . . . ). Peer discovery interval 852 includes a listen portion 854, a transmit portion 856 and a listen portion 858, from the perspective of the exemplary mobile communications device operating in the second mode of operation. Similarly, peer discovery interval 862 includes a listen portion 864, a transmit portion 866 and a listen portion 868, from the perspective of the exemplary mobile communications device operating in the second mode of operation.

In the second mode of operation, in this exemplary embodiment, the start of the peer discovery portion is synchronized to the external timing reference signal. In addition, in this example, the end of the sleep interval is synchronized to the external timing reference signal. External timing signal 851, e.g., a GPS signal, repeats as external timing signal 861 with a period 880.

When comparing operation in the first mode of operation with operation in the second mode of operation, it may be observed that sleep intervals are longer in the second mode of operation. The higher level of synchronization in the second mode of operation allows for longer sleep intervals in the second mode of operation timing structure as compared to the first mode of operation. In addition, in this example peer discovery intervals in the first mode of operation are longer than in the second mode of operation. The longer sleep intervals and/or shorter peer discovery intervals in the second mode of operation, when compared to the first mode of operation, facilitates reduced battery consumption in the second mode of operation in comparison to the first mode of operation.

Figure 9:
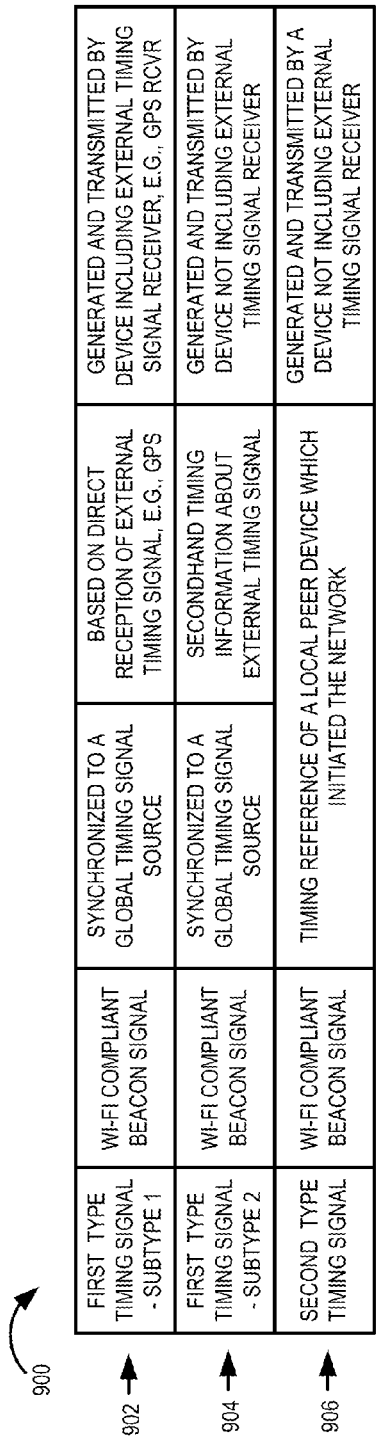
FIG. 9 is a table listing different exemplary timing signals that are used in some exemplary embodiments to communicate timing synchronization information.

FIG. 9 is a table 900 listing different exemplary timing signals that are used in some exemplary embodiments to communicate timing synchronization information. First row 902 describes that a first subtype of a first type of timing signal is a Wi-Fi compliant beacon which is synchronized to a global timing signal source, e.g., GPS, and is based on direct reception of the external timing signal, e.g., GPS signal, by the device which generated and transmitted the beacon. The first type, first sub-type, timing signal is generated and transmitted by a device including an external timing signal receiver, e.g., including a GPS receiver.

Second row 904 describes that a second subtype of a first type of timing signal is a Wi-Fi compliant beacon which is synchronized to a global timing signal source, e.g., GPS, but provides secondhand timing information about the external timing signal. The device which generates and transmits the first type, second sub-type timing signal, did not directly receive the external timing signal, e.g., did not directly receive the GPS signal. The first type, second sub-type, timing signal is generated and transmitted by a device that does not include an external timing signal receiver, e.g., does not include a GPS receiver.

Third row 906 describes that a second type of timing signal is a Wi-Fi compliant beacon in which the timing reference is the reference of a local peer device which initiated the local peer to peer network. The second type of timing signal is generated and transmitted by a device that does not include the external timing signal receiver, e.g., does not include a GPS receiver.

Figure 10:
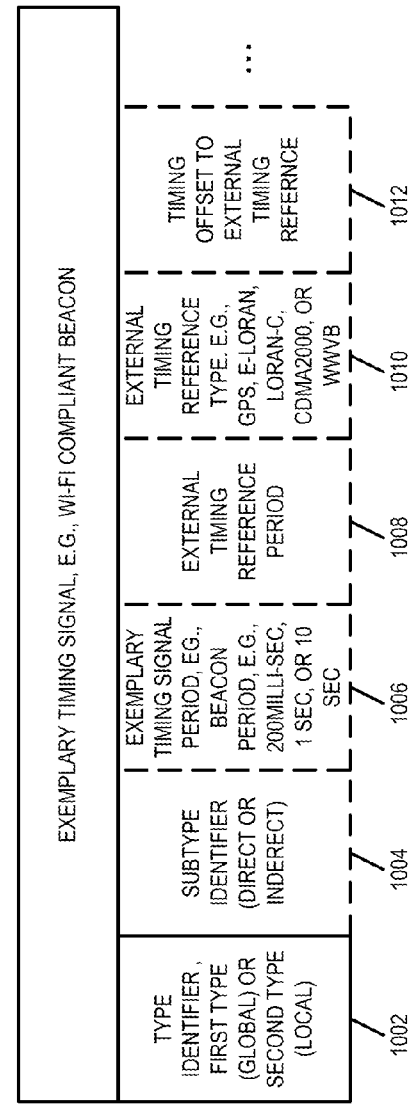
FIG. 10 is drawing illustrating an exemplary format of an exemplary timing signal, e.g., a Wi-Fi compliant beacon.

FIG. 10 is drawing illustrating an exemplary format of an exemplary timing signal 1000, e.g., a Wi-Fi compliant beacon. For example, the format described with respect to FIG. 10, in some embodiments, applies to any of the different timing signals described with respect to FIG. 9.

Exemplary timing signal 1000 includes a type identifier field 1002 and may, and sometimes does, include one or more of optional fields (1004, 1006, 1008, 1010, 1012). Type identifier field 1002 communicates whether the timing signal 1000 is a first type of timing signal or a second type of timing signal. The type identifier field is used to distinguish between global timing synchronization and local timing synchronization.

Subtype identifier field 1004 is used when the timing signal is a timing signal of the first type. Subtype identifier field 1004 communicates information indicating whether the timing signal is based on direct reception of the external signal or based on indirect secondhand timing information which was recovered.

Timing signal period field 1006, e.g., beacon period field, conveys information indicating the periodicity of the timing signal, e.g., beacon signal. In some embodiments information in field 1006 identifies one of a plurality of predetermined periods, e.g., 200 ms, 1 sec or 10 seconds. External timing reference period 1008 conveys information indicating the periodicity of the external timing reference signal, e.g., the periodicity of the GPS signal being used as a global reference. External time reference type field 1010 conveys information identifying one of a plurality of alternative external timing reference types, e.g., GPS, eLoran, LORAN-C, CDMA2000 or WWVB, DTV or LTE. Timing offset to external timing reference field 1012 conveys information indicating the timing offset of the exemplary timing signal 1000 with respect to the external timing reference signal.

Figure 11:
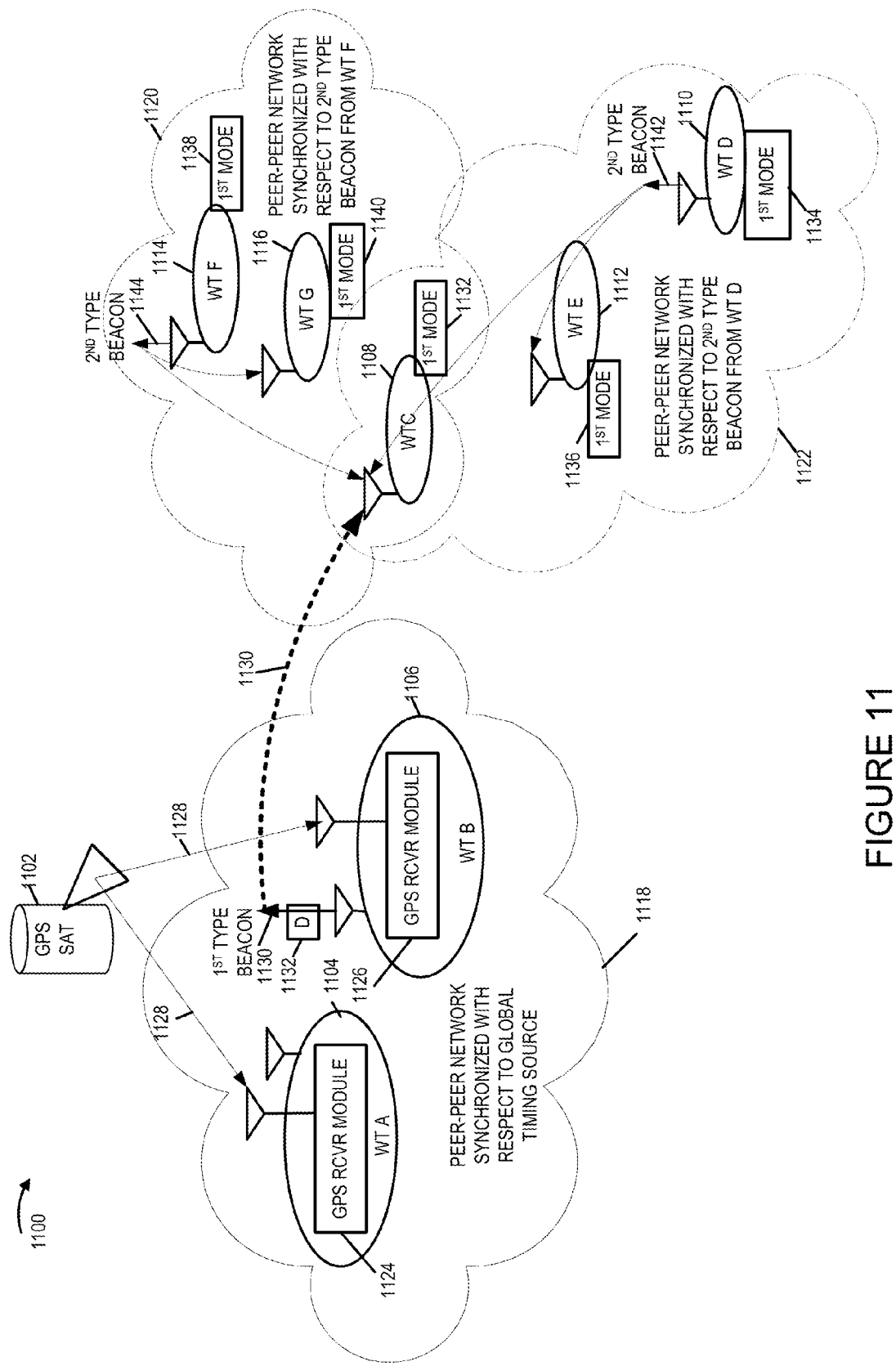
FIG. 11 illustrates an exemplary external timing signal source, a first peer to peer network which is synchronized with respect to the external timing signal source, a second peer to peer network which is not synchronized with respect to the external timing signal source, and a third peer to peer network which is not synchronized with respect to the external timing synchronization source.
Figure 12:
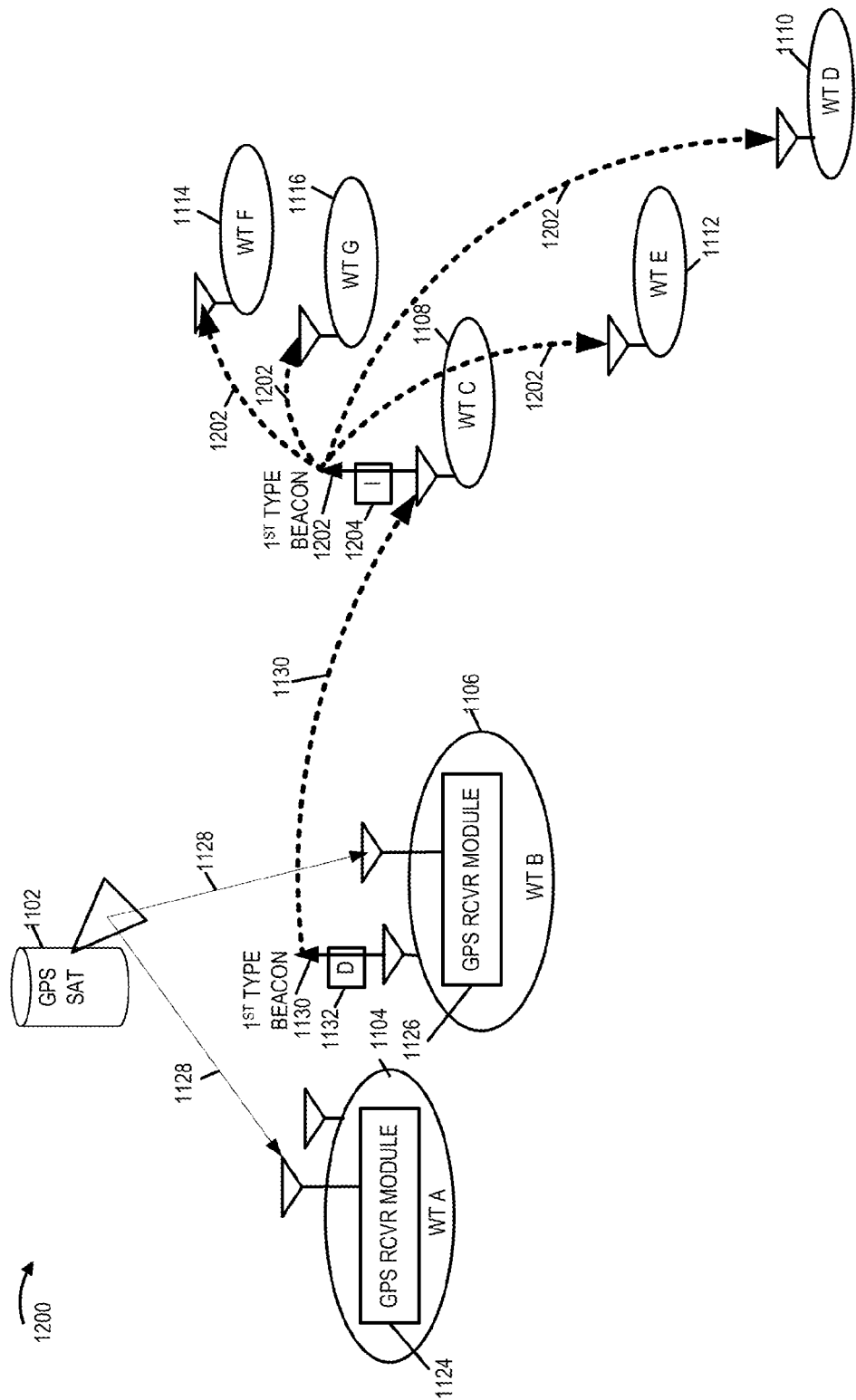
FIG. 12 illustrates the propagation of external timing signal source timing information via beacons.
Figure 13:
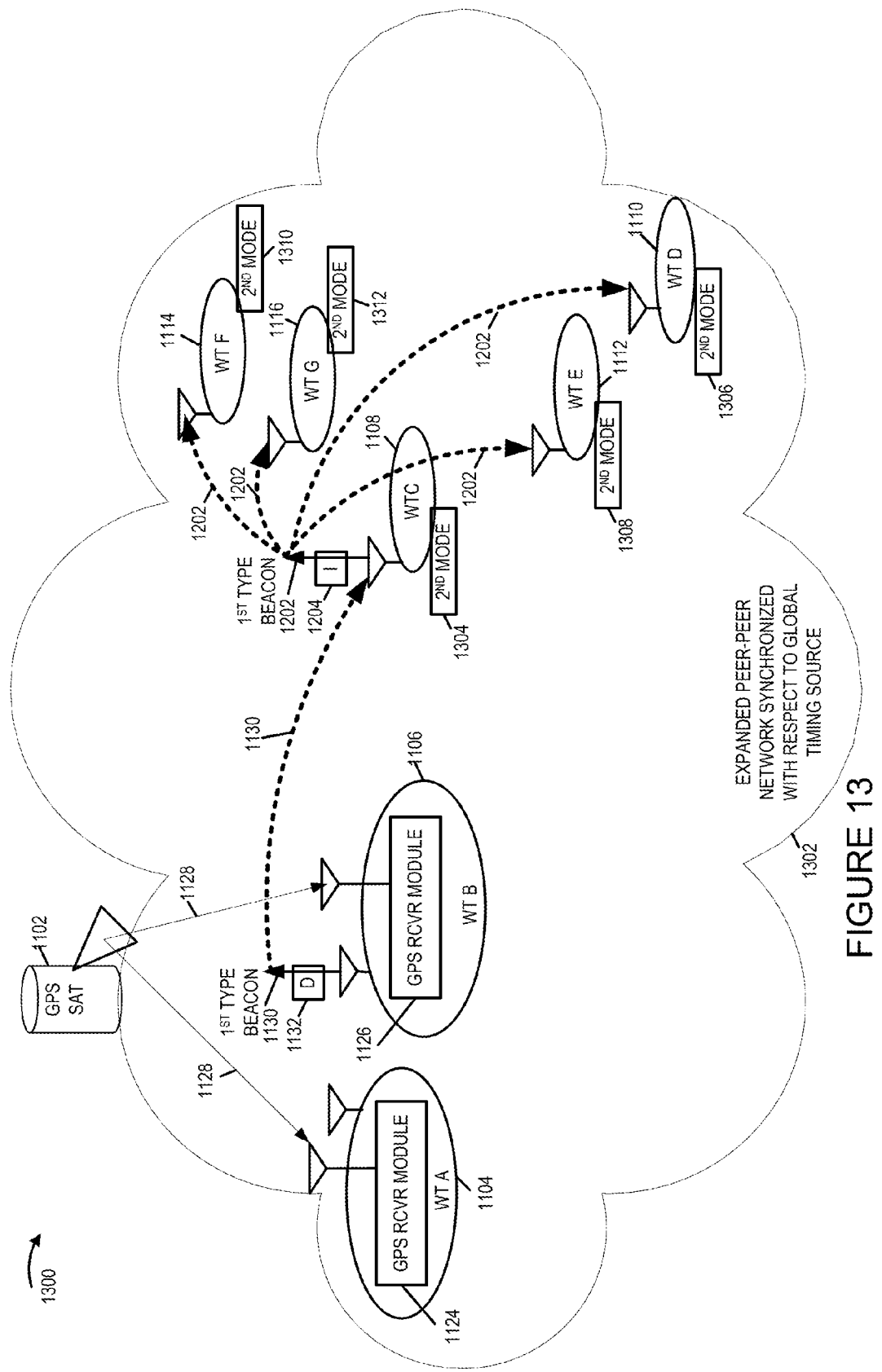
FIG. 13 illustrates an expanded peer to peer network which mobile communications devices without an external signal source receiver are synchronized with respect to the external timing signal source.

FIGS. 11-13 provide an example in which devices without external reference signal receivers are integrated into a peer to peer network which uses an external reference signal source, e.g., GPS, as the basis for global timing synchronization. The integration is achieved through the relaying of timing synchronization information. Following integration into the peer to peer network using the external reference signal source the integrated devices can advantageously operate in a more efficient manner due to the higher level of synchronization, e.g., remaining in sleep state for longer intervals and conserving battery power.

Drawing 1100 illustrates an exemplary GPS satellite 1102, an exemplary first peer to peer network 1118, an exemplary second peer to peer network 1120 and an exemplary third peer to peer network 1122. The GPS satellite 1102, which is an external timing synchronization source, is sometimes also referred to as a global timing source. The GPS satellite 1102 generates and transmits external timing synchronization signal 1128, e.g., a GPS signal. First peer to peer network 1118 is synchronized with respect to the global timing source. Peer to peer network 1118 includes wireless terminal A 1104 and wireless terminal B 1106, each including a GPS receiver module (1124, 1126), respectively. The external timing signal 1128 from GPS satellite 1102 is received and processed by WT A 1104 and WT B 1106. WT A 1104 and WT B 1106 synchronize with respect to the external timing synchronization source signal.

Second peer to peer network includes WT F 1114, WT G 1116 and WT C 1108. In second peer to peer network WT F 1114 is generating and transmitting a 2nd type beacon signal 1144, which serves as a timing synchronization source for network 1120. For example, WT F 1114 may have started peer to peer network 1120 and thus serves as the local synchronization source. Second type beacon 1144 is, e.g., a second type timing signal in accordance with row 906 of FIG. 9. In peer to peer network 1120 wireless terminals are synchronized with respect to 2nd type beacon 1144 from WT F 1114.

Third peer to peer network includes WT D 1110, WT E 1112 and WT C 1108. In second peer to peer network WT D 1110 is generating and transmitting a 2nd type beacon signal 1142, which serves as a timing synchronization source for network 1122. For example, WT D 1110 may have started peer to peer network 1122 and thus serves as the local synchronization source. Second type beacon 1142 is, e.g., a second type timing signal in accordance with row 906 of FIG. 9. In peer to peer network 1122 wireless terminals are synchronized with respect to 2nd type beacon 1142 from WTD 1110.

In this example, each of the devices (WT C 1108, WT D 1110, WT E 1112, WT F 1114 and WT G 1116) does not include a GPS receiver module, and thus devices (1108, 1110, 1112, 1114, and 1116) are unable to directly receive and process GPS signal 1128, the external global timing synchronization source.

In this example, the level of timing synchronization achieved in first network 1118, is higher than the level of timing synchronization achieved in either of the second or third peer to peer networks (1120, 1122). The sleep states are longer in peer to peer network 1118, which relies on the external synchronization source, than in either of the peer to peer networks (1120, 1122) which does not rely on an external synchronization source. In addition, the timing of peer to peer network 1120 is independent of the timing of peer to peer network 1122. Therefore wireless terminal C 1108 which is participating in both networks 1120 and 1122 needs to be coordinating and tracking timing for both networks. In general, WT C 1108 remains powered on and gets less sleep state time so that it can participate in both networks. For example, its needs to be powered on in discovery time intervals corresponding to both networks.

In this example, WTs (1108, 1110, 1112, 1114, 1116) are currently operating in a first mode of operation as indicated by blocks (1132, 1134, 1136, 1138, 1140), respectively. WT B 1106 generates and transmits 1st type beacon signal 1130 communicating that the timing information being communicated is based on direct reception of external timing signal 1128. For example, 1st type beacon signal 1130 corresponds to a format in accordance with first type timing signal—subtype 1 as indicated by row 902 of FIG. 9. Beacon signal 1130 is in some embodiments in accordance with the format of signal 1000 of FIG. 10. Block D 1132 represents that beacon signal 1130 communicates information that is based on direct reception of a global timing signal by the device transmitting beacon signal 1130. For example, field 1004 of beacon signal 1130 indicates direct. Beacon signal 1130 may also communicate first or global type in field 1002 and identity GPS in field 1010, in addition to communicating other relevant timing information in the other fields (1006, 1008, 1012). WT A 1104, decides not to transmit a timing synchronization signal because, e.g., it is very close to WT B 1106 and/or WT A 1104 has a low level of current battery power.

WT C 1108, which is in reception range of WT B 1106, receives and detects 1st type beacon signal 1130. In some embodiments, WT C 1108 monitors for 1st type beacons of the first sub-type while in the first mode of operation during time intervals that it is being operated to receive signals corresponding to one or more local peer to peer networks in which it is a participant, e.g., first mode discovery intervals in which it is listening. In some embodiments, WT C 1108 monitors for 1st type beacons of the first type while in the first mode of operation during additional time intervals in addition to its normal local network operations. For example, at a lower rate than the rate of peer discovery monitoring in network 1120, WT C 1108 monitors for 1st type beacon signals of the first sub-type from a network synchronized with respect to a global timing source. In this example, WT C 1108 receives 1st type beacon 1130 and recovers the information communicated by beacon 1130.

FIG. 12 is a drawing 1200 which illustrates the propagation of timing synchronization information. Based on received beacon 1130, WT C 1108 synchronizes with respect to the global timing source. In addition, WT C 1108 makes a decision to propagate timing synchronization information. For example, WT C 1108 determines that it has sufficient remaining battery power to support transmission of a timing synchronization beacon 1202. WT C 1108 also determines the rate at which to transmit beacon 1202, e.g., as a function of remaining battery power. The determinations of whether or not to transmit beacon 1202 and/or the rate of transmission in various embodiments, are a function of other factors, e.g., the number of received beacons, the number of received beacons of a type or sub-type, and/or the number of devices in its vicinity that it expects would receive, would use, and/or could benefit from receiving and processing beacon 1202.

In this example, WT C 1108 decides to generate and transmit 1st type beacon 1202. 1st type beacon 1202 communicates that the timing information about the external timing reference is being communicated indirectly. WT C 1108 has not directly received and processed GPS signal 1128 but is relying on timing synchronization information conveyed from another device, WT B 1106. For example, 1st type beacon signal 1202 corresponds to a format in accordance with first type timing signal—subtype 2 as indicated by row 904 of FIG. 9. Beacon signal 1202 is in some embodiments in accordance with the format of signal 1000 of FIG. 10. Block I 1204 represents that beacon signal 1202 communicates timing information about the global timing reference that is based on a received beacon signal not based on direct reception of signal 1128 by WT C 1108. For example, in beacon signal 1202 field 1004 indicates indirect. Beacon signal 1202 may also communicate first or global type in field 1002 and identity GPS in field 1010, in addition to communicating other relevant timing information in the other fields (1006, 1008, 1012).

Drawing 1300 of FIG. 13 illustrates that WTs (WT D 1110, WT E 1112, WT F 1114, WT G 1116) have received and processed the 1st type beacon signal 1202 of the second sub-type. FIG. 13 indicates that WTs (WT C 1108, WT D 1110, WT E 1112, WT F 1114, WT G 1116) transition to a second mode of operation as indicated by blocks (1304, 1306, 1308, 1310, 1312). In the first mode of operation a WT is synchronized with a local timing reference, while in the second mode of operation a WT is synchronized with respect to an external signal source, e.g., GPS. In addition the level of synchronization is higher in the second mode than in the first mode. A wireless terminal also has longer sleep states in the second mode than in the first mode. Based on the propagation of timing information regarding the external timing signal 1128, through beacon 1130 and beacon 1202, wireless terminals without a GPS receiver module have been integrated into a network synchronized with respect to a global timing source. Network 1302 is an expanded peer to peer network in which wireless terminals, e.g., mobile devices, (WT A 1104, WT B 1106, WT C 1108, WT D 1110, WT E 1112, WT F 1114, WT G 1116) are synchronized either directly or indirectly with respect to a global timing source, e.g. GPS. Expanded network 1302 is an expansion of network 1118 of FIG. 11. WT C 1108 is, e.g., a mobile communications device implementing a method in accordance with flowchart 500 of FIG. 5 and/or implemented in accordance with FIG. 6 and/or FIG. 7.

Various method and apparatus are related to power efficient signaling, e.g. power efficient use of Wi-Fi. In various embodiments, a network, e.g., a peer to peer ad-hoc network, is synchronized to an external timing source. In some embodiments, a wireless communications device, e.g., a WiFi device, synchronizes to a global timing source signal, which is an out of band signal, and the wireless communications device uses this timing information for running certain applications, e.g., running applications over a WiFi channel. Some wireless communications devices include a receiver for receiving a global timing source signal directly. In various embodiments, a wireless device which receives a global timing signal may, and sometimes does, propagate timing synchronization information, e.g., via a Wi-Fi beacon. Some wireless communications devices which do not include a receiver for receiving the global timing source signal receive a Wi-Fi beacon signal communicating timing synchronization about the global timing signal source and synchronize with respect to the global timing signal source based on the received information from the beacon. Thus some wireless communications devices, e.g., high capability devices, achieve synchronization directly with the external timing synchronization source, while other devices, e.g., lower capability device, achieve timing synchronization with the external timing synchronization source indirectly.

Exemplary global external timing sources are, e.g., GPS, eLoran/LORAN-C, CDMA 2000, WWVB, DTV and LTE. Some of these sources can provide accurate timing information up to a few microseconds. Some of the sources can work indoors as well as outdoors.

In some embodiments, after a wireless communications device obtains timing synchronization information, it uses this global timing synchronization in passive mode to determine when to wake up. For example, in one exemplary embodiment, a device will wake up every second, to perform certain applications. Note that each of the devices using this solution would wake up at the same time, since they will be synchronized to the same timing source. The examples of the application include, but are not limited to 1. Exchange peer discovery/presence information
2. Exchange traffic routing information (e.g. for multihop communication)
3. Connection setup requests
4. Traffic monitoring for requests indicating intention to transmit.

Note that these examples are applications that the device may be doing even if it is in the sleep mode, so an efficient implementation of these will have an impact on the stand by time of the device.

In some exemplary implementations the timing information is obtained from GPS, and the information being exchanged is peer discovery/presence information. In one exemplary embodiment, the devices wake up every second (synchronized to the GPS second), and stay awake for certain amount of time. This time can be fixed or can depend on the interference environment seen. If there is no active connection, that the device is involved in, then the device goes to sleep till the next second.

In some embodiments, at least some wireless communications devices use legacy WiFi chips and do not include a receiver to directly receive a signal from the external global signal source, e.g., the wireless communications device does not include a GPS receiver module.

Some enhanced wireless communications devices with the capability to receive the global external signal, e.g., with a GPS receiver, directly receive and use the external source signal, e.g., a GPS signal, to synchronize to a global timing reference. These enhanced devices have hardware in them to acquire this timing information. After synchronizing to an external timing source, an enhanced device, in some embodiments, starts or participates in an adhoc network, e.g. an enhanced peer to peer network synchronized to the external signal source. In some embodiments, the device in the enhanced network synchronized to the global timing signal source uses one of more of:

pre-agreed names or SSIDs, e.g., "Globally Synced WiFi"
pre-agreed beacon periods, e.g., 100 ms, 1 second, 10 second
pre-agreed timing reference, e.g., synchronized to a GPS second In some embodiments, devices without the global external signal receiver capability are not initially synchronized to the global time reference but monitor for the existence of enhanced networks synchronized to a global timing signal source. For example, at a slower rate a device without an external signal receiver, e.g., a device without a GPS receiver, monitors for existence of enhanced networks, e.g., monitors for beacon signals communicating the pre-agreed upon SSIDs indicating globally Synced Wi-Fi. After an enhanced network has been discovered and external timing signal source information obtained from the received beacon signal, the device can, and sometimes does join the enhanced network. The device without the external receiver capability can achieve power efficiency over prior operation because of the duty cycle due to beacon periods. For example the device without the external receiver capability, when operating in a mode in which it is indirectly synchronized to the external signal source can have less on time and more sleep time than when in a mode in which it is not synchronized to the external signal source. In some embodiments, when synchronized to the external signal source the device has at least on average 10 times the amount of sleep time than when not synchronized to the external signal source. In other embodiments, the increase in sleep time is at least 20, 30, 40 or ever 50 times on average, that which occurs when the device is not synchronized to the external timing signal. In various embodiments, a device without an external signal receiver, can and sometimes does, further propagate timing information pertaining to the external timing signal, to other device without external signal source receivers.

Note that each of the devices using this solution would wake up at the similar times. In various embodiments the propagation delays are minimal In various embodiments, devices without an external signal receiver, e.g., without a GPS receiver, are synchronized indirectly to the same timing source as devices with an external signal source receiver, e.g., with a GPS receiver. This could enable power efficient operation for applications such as:
1. Exchange peer discovery/presence information
2. Exchange traffic routing information (e.g. for multihop communication)
3. Connection setup requests
4. Traffic monitoring for requests indicating intention to transmit.

Note that each of these examples are applications that the device may be doing even if it is in the sleep mode, so an efficient implementation of these will significantly increase the stand by time of the device.

In an exemplary implementation where the timing reference is the GPS second, and the beacon period is one second, the information being exchanged is peer discovery/presence information. In this case, the devices wake up every second (synchronized to the GPS second), and stays awake for certain amount of time. This time could be fixed or could depend on the interference environment seen. If there is no active connection, that the device is involved in, then the device goes to sleep till the next second.

One or more devices without an external signal source receiver which participate in this exemplary implementation may be, and normally are, within (multihop) proximity of a device including an external signal source receiver. Some devices without an external signal source receiver, e.g., without a GPS receiver, are legacy devices which have been upgraded. For example, in some embodiments, firmware and/or software is changed in a legacy device to configure it to listen for enhanced networks, e.g., on a slow time scale. Then after discovering an enhanced network, it may and sometimes does participate in the enhanced network, e.g., resulting in power efficiency.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first mobile communications device operating in an unlicensed frequency band, the method comprising:
   while operating in a first mode of operation, receiving a timing signal of a first type from a second mobile communications device, said first type of timing signal being synchronized to an external timing signal from an external timing signal source;
   determining if said second mobile communications device has been synchronized with said external timing signal based on direct receipt of said external timing signal or based on a signal from another communications device which received said external timing signal;
   synchronizing an internal clock based on the received timing signal from the second mobile communications device; and
   after synchronizing the internal clock, switching to a second mode of operation wherein sleep state intervals in said second mode of operation are longer in duration than sleep state intervals in said first mode of operation.

2. The method of claim 1, wherein said timing signal from the second mobile communications device communicates timing information which is transmitted by the second communications device after having achieved synchronization with said external timing signal.

3. The method of claim 2, wherein said external timing signal is one of a global positioning signal, eLoran signal, LORAN-C signal, CDMA 2000 signal, WWVB signal, DTV signal and LTE signal.

4. The method of claim 1, wherein determining if said second mobile communications device has been synchronized with said external timing signal based on direct receipt of said external timing signal or based on a signal from another communications device which received said external timing signal includes:
   recovering information from the received timing signal indicating whether said second mobile communications device is synchronized with said external timing signal based on direct receipt of said external timing signal or based on a signal from another communications device which received said external timing signal.

5. The method of claim 1, further comprising, when it is determined that said second mobile communications device is synchronized with the external timing signal based on direct receipt of said external timing signal:
   deciding whether or not to periodically transmit a timing synchronization signal during said second mode of operation.

6. The method of claim 5, wherein said timing signal from the second mobile communications device is received in a beacon signal; and
   wherein said decision whether or not to periodically transmit a timing synchronization signal is a function of:
   a number of first type timing signals being received on a periodic basis from other communications devices which are synchronized with said external signal based on receipt of said external timing signal.

7. A first mobile communications device comprising:
   means for receiving a timing signal of a first type from a second mobile communications device while operating in a first mode of operation, said first type of timing signal being synchronized to an external timing signal from an external timing signal source;
   means for determining if said second mobile communications device has been synchronized with said external timing signal based on direct receipt of said external timing signal or based on a signal from another communications device which received said external timing signal;
   means for synchronizing an internal clock based on the received timing signal from the second mobile communications device; and
   means for switching to a second mode of operation, wherein sleep state intervals in said second mode of operation are longer in duration than sleep state intervals in said first mode of operation, after synchronizing the internal clock.

8. The first mobile communications device of claim 7, wherein said timing signal from the second mobile communications device communicates timing information which is transmitted by the second communications device after having achieved synchronization with said external timing signal.

9. The first mobile communications device of claim 8, wherein said external timing signal is one of a global positioning signal, eLoran signal, LORAN-C signal, CDMA 2000 signal, WWVB signal, DTV signal and LTE signal.

10. The first mobile communications device of claim 7, wherein said means for determining includes:
  means for recovering information from the received timing signal indicating whether said second mobile communications device is synchronized with said external timing signal based on direct receipt of said external timing signal or based on a signal from another communications device which received said external timing signal.

11. The first mobile communications device of claim 7, further comprising:
  means for deciding whether or not to periodically transmit a timing synchronization signal during said second mode of operation when it is determined that said second mobile communications device is synchronized with the external timing signal based on direct receipt of said external timing signal.

12. The first mobile communications device of claim 8, wherein said timing signal from the second mobile communications device is received in a beacon signal.

13. A computer program product for use in a first mobile communications device, the computer program product comprising:
  a non-transitory computer readable medium comprising:
    code for causing at least one computer to receive a timing signal of a first type from a second mobile communications device while operating in a first mode of operation, said first type of timing signal being synchronized to an external timing signal from an external timing signal source;
    code for causing said at least one computer to determine if said second mobile communications device has been synchronized with said external timing signal based on direct receipt of said external timing signal or based on a signal from another communications device which received said external timing signal;
    code for causing said at least one computer to synchronize an internal clock based on the received timing signal from the second mobile communications device; and
    code for causing said at least one computer to switch to a second mode of operation wherein sleep state intervals in said second mode of operation are longer in duration than sleep state intervals in said first mode of operation, after synchronizing the internal clock.

14. The computer program product of claim 13, wherein said code for causing said at least one computer to determine includes:
  code for causing said at least one computer to recover information from the received timing signal indicating whether said second mobile communications device is synchronized with said external timing signal based on direct receipt of said external timing signal or based on a signal from another communications device which received said external timing signal.

15. The computer program product of claim 14, wherein said external timing signal is one of a global positioning signal, eLoran signal, LORAN-C signal, CDMA 2000 signal, WWVB signal, DTV signal and LTE signal.

16. A first mobile communications device comprising:
  at least one processor configured to:
    receive a timing signal of a first type from a second mobile communications device while operating in a first mode of operation, said first type of timing signal being synchronized to an external timing signal from an external timing signal source;
    recover information from the received timing signal indicating whether said second mobile communications device is synchronized with said external timing signal based on direct receipt of said external timing signal or based on a signal from another communications device which received said external timing signal;
    synchronize an internal clock based on the received timing signal from the second mobile communications device; and
    switch to a second mode of operation wherein sleep state intervals in said second mode of operation are longer in duration than sleep state intervals in said first mode of operation, after synchronizing the internal clock; and
  memory coupled to said at least one processor.

17. The first mobile communications device of claim 16, wherein said timing signal from the second mobile communications device communicates timing information which is transmitted by the second communications device after having achieved synchronization with said external timing signal.

18. The first mobile communications device of claim 17, wherein said external timing signal is one of a global positioning signal, eLoran signal, LORAN-C signal, CDMA 2000 signal, WWVB signal, DTV signal and LTE signal.

19. The first mobile communications device of claim 17, wherein said at least one processor is further configured to:
  decide whether or not to periodically transmit a timing synchronization signal during said second mode of operation when it is determined that said second mobile communications device is synchronized with the external timing signal based on direct receipt of said external timing signal.

* * * * *